US006411924B1

(12) United States Patent
de Hita et al.

(10) Patent No.: US 6,411,924 B1
(45) Date of Patent: Jun. 25, 2002

(54) SYSTEM AND METHOD FOR LINGUISTIC FILTER AND INTERACTIVE DISPLAY

(75) Inventors: Carolina Rubio de Hita; David van den Akker, both of Antwerp (BE); Venu Vemula, Sunnyvale, CA (US); Philippe Forest, Antwerp (BE)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 09/012,849

(22) Filed: Jan. 23, 1998

(51) Int. Cl.⁷ .............................................. G06F 17/27
(52) U.S. Cl. ......................................................... 704/9
(58) Field of Search .................. 701/1, 9–10; 707/1–4, 707/530, 531, 536, 100

(56) References Cited

U.S. PATENT DOCUMENTS

| | | | | |
|---|---|---|---|---|
| 5,548,507 A | * | 8/1996 | Martino et al. ................. | 704/9 |
| 5,659,766 A | * | 8/1997 | Saund et al. .................... | 704/9 |
| 5,940,821 A | * | 8/1999 | Wical ............................. | 704/9 |
| 5,953,718 A | * | 9/1999 | Wical ............................. | 707/5 |

OTHER PUBLICATIONS

ISOQuest Products: NETOWL Product information downloaded from the Internet URL http://www.isoquest.com/products_data.html; (1 page) dated 1996.
ISOQuest Products: NETOWL Desktop information downloaded from the Internet URL http://www.isoquest.com/desktop_data.html; (4 pages) dated 1996.

* cited by examiner

*Primary Examiner*—Patrick N. Edouard
(74) *Attorney, Agent, or Firm*—Dinsmore & Shohl LLP

(57) ABSTRACT

A computer-implemented information analysis and display system, called a linguistic filter, and method is provided to dynamically generate and display topics representing the linguistic content of documents in a file system. The documents may be user-selected. Also, the user operates a user computer to select one or more of such dynamically generated and displayed topics, preferably using a graphical user interface. The linguistic filter displays document identifiers corresponding to those documents that are described by one or more of the topics selected by the user. The file system may be local, or remote, or both. A user may select for display only those topics representing the linguistic content of documents that are written in one or more user-selected natural languages. Also, topics of documents written in a natural language may be displayed in relation to such natural language. The linguistic filter displays a graphical user interface including a document window and a topic tree window. In some implementations, the document window includes document identifiers and associated lists of topics representing the linguistic content of the documents represented by the document identifiers. In some implementations, the topic tree window includes a hierarchical representation including a collapsible and expandible, tree-like graphical structure of topics. Such hierarchical representation is typically a single merged representation of topics that represents the linguistic content of the user-selected documents taken as a whole. Alternatively, such hierarchical representation is a single merged representation of topics that represents the linguistic content of the associated lists of topics as a whole. A user may display the text of one or more documents by selecting one or more document identifiers in the document window, or one or more topics in the topic tree window. If the user selects one or more topics from the list of topics in a document entry in the document window, or from the topics in the topic tree window, the texts of the document or documents corresponding to such selected topic or topics are displayed, and the grammatical units corresponding to the selected topic or topics are highlighted.

41 Claims, 18 Drawing Sheets

SYSTEM AND METHOD FOR LINGUISTIC FILTER AND INTERACTIVE DISPLAY

RELATED APPLICATIONS

The following applications are related to the present application and are incorporated by reference as specified in the specification of this application.

U.S. Patent Application entitled "NATURAL LANGUAGE INFORMATION RETRIEVAL SYSTEM AND METHOD," application Ser. No. 08/916,628, and naming as inventors Carolina Rubio de Hita, David van den Akker, Erik C. E. Govaers, Frank M. J. Platteau, Kurt Van Deun, Melissa MacPherson, Peter De Bie, and Sophie Laviolette, assigned to the assignee of the present invention.

U.S. Patent Application entitled "SYSTEM AND METHOD FOR IDENTIFYING LANGUAGE USING MORPHOLOGICALLY-BASED TECHNIQUES," application Ser. No. 08/878,264, and naming as inventor David van den Akker, assigned to the assignee of the present invention.

BACKGROUND OF THE INVENTION

1. Field of the Invention

The present invention relates generally to computer-implemented information retrieval systems and methods and, more particularly, to such systems and methods for identifying and displaying information based upon the linguistic content of the information.

2. Related Art

Increasing collection and exchange of computer-readable or computer-accessible documents, such as electronic mail, technical documentation, publications, notes, correspondence, and so on, require improved methods and systems for retrieving particular documents and efficiently displaying them to a user. Various conventional techniques have been developed to search through collections of documents and display the results. However, these conventional techniques have many drawbacks that limit their effectiveness in allowing a user quickly and intuitively to find and examine documents of interest.

One group of such conventional techniques involves searching documents by keywords, topics, titles, or other subject-matter indicators inserted in the documents by their authors. Such techniques generally limit the documents found by a user because the user typically must choose the same, or similar, keywords as those chosen by the authors. There is thus no assurance that a document pertaining to a particular subject matter will, first, be described by the author by the use of a particular keyword, or by any keyword at all, or, second, that the user will choose to search by a keyword chosen by the author. Also, such techniques often require repeated inquiries by the user until a desired document is found. Each such inquiry possibly may require significant effort to devise appropriate keywords or combinations of keywords, and the user generally cannot be assured that the most appropriate keywords or combinations have been tried. Methods for combining keywords may be unintuitive, and unique to each search mechanism. Repeated inquiries may consume significant amounts of time, and it may be difficult or impossible to alter previous steps to change the current search results without repeating the entire process. In addition, such keyword-searching techniques typically do not display information about the subject matter of the entire group of documents that is being searched, as contrasted with information about the particular documents in the group that satisfy the search criteria. Similarly, such techniques often do not present the results of searches, or repeated searches, in a manner that enables a user quickly, efficiently, and intuitively to compare the documents retrieved by one search with documents retrieved by another search in order to choose the most promising direction for further searching.

Other conventional systems or methods may attempt to display limited information about the subject matter of the groups of documents that are being searched. Such systems or methods may allow a user to select among a list of keywords, topics, titles, or other subject-matter indicators. Such list may be presented as an index, for example. However, in such systems, it is not provided that such list in fact describes the subject matter of the particular group of documents being searched. Rather, the list may consist of a predetermined group of subjects that are presumed to describe the content of representative collections of documents in general, or in particular subject areas. Other lists may include author-supplied descriptors, but, as noted, various authors may not use the same keywords to describe the same subject matter, or may not use keywords that a user would look for, or recognize, as being descriptive of a desired subject matter.

Still other conventional systems or methods may apply limited linguistic analysis to a group of documents in order to attempt automatically to provide information about their subject matter; that is, without relying on author-supplied keywords. For example, such systems or methods may attempt to identify proper nouns that are categorized by comparing them to a dictionary of proper nouns. Such systems or methods typically have significant limitations, including the inability to identify recently coined proper nouns used, for example, in quickly evolving technological fields. Also, certain parts of speech, such as proper nouns, may be systematically underrepresented in certain types of documents, such as is often the case with respect to proper nouns in technical documentation. Further, such systems or methods may not be capable of distinguishing among various uses of the same proper noun. For example, the proper noun "Madonna" may be categorized as pertaining to music or religion, rather than to visual art, because the system or method does not analyze the full morphological and syntactic context in which the proper noun appears.

With respect to all such conventional systems or methods, a user generally may not efficiently and intuitively identify from an initial collection of documents a sub-collection of documents that are likely to pertain to a subject matter of interest. Similarly, a user generally may not efficiently and intuitively further identify a sub-sub-collection of the original document collection, and so on, until a manageably small number of documents remains to be examined. Moreover, information displayed to a user about the subject matter of a collection of documents generally is not presented in an efficient and intuitive manner such that the user may readily determine whether such collection of documents contains a subject matter of interest, or how such desired subject matter relates to other subject matter contained in the collection of documents.

Accordingly, what is needed is a system and method that comprehensively and automatically (i.e., without relying on keywords or other subject-matter indicators inserted by authors) displays to a user the subject matter of a collection of documents, and enables a user intuitively and efficiently to find sub-groups of such collection containing subject matter of interest. In particular, what is needed is a system and method that efficiently displays information about the subject matter of the groups of documents that are being searched. Also, such system and method should enable a user quickly, efficiently, and intuitively to examine and alter the display in order to compare the documents retrieved by one search with documents retrieved by another search, or to successively narrow a search, in order to choose the most promising direction for further searching or to display desired documents.

SUMMARY OF THE INVENTION

The present invention is a computer-implemented information analysis and display system and method that dynamically generates and displays topics representing a linguistic content of documents in a file system. In accordance with one aspect of the invention, referred to as a linguistic filter, the documents are user-selected. In accordance with one aspect, the user operates a user computer to select one or more of such dynamically generated and displayed topics, preferably using a graphical user interface. In some embodiments, the linguistic filter displays document identifiers corresponding to those documents that are described by one or more of the topics selected by the user. In such, and other, embodiments, the linguistic filter displays the place or places within a document, or group of documents, at which are located linguistic content giving rise to one or more selected topics.

In one embodiment, the file system is local to the user computer; that is, it is located within the user computer or directly connected to it. In an alternative embodiment, the file system may include one or more file systems that are remote to the user computer; that is, the remote file systems are connected to the user computer through a network, or networks of networks.

In one embodiment, the linguistic filter of the present invention includes an interface manager, a linguistic topic analyzer, and a display manager. The interface manager retrieves selected files from the file system and generates graphical user interfaces to display document identifiers and topics generated by the linguistic topic analyzer, and to receive user selections of files or topics. The linguistic topic analyzer generates the topics representing the linguistic content of the documents based on morphological and syntactic evaluation of the documents. The display manager displays the document identifiers of all, or of a user-selected portion, of the documents so analyzed by the linguistic topic analyzer. Also, the display manager displays those documents having a linguistic content represented by one or more user-selected topics. In one implementation, such user-selected topics may be combined using boolean operators. In one embodiment, the display manager displays the place or places within a document, or group of documents, at which are located linguistic content giving rise to one or more selected topics.

In one embodiment, the linguistic filter also includes a language identifier. The language identifier identifies the natural languages of the documents. In some implementations, a user advantageously may select for display only those topics representing the linguistic content of documents that are written in one or more user-selected natural languages. In some implementations, topics of documents written in one natural language may be displayed in relation to such natural language, topics of documents written in another natural language may be displayed in relation to such other natural language, and so on.

In one embodiment, the interface manager includes a graphical user interface (GUI) interpreter, a GUI generator, and a file folder retriever. The GUI interpreter receives information regarding a user's selection from a graphical user interface, and directs such information to other modules of the linguistic filter of the present invention, including the file folder retriever. The GUI generator generates graphical user interfaces for displaying information to the user and for enabling the user to make a selection from such displayed information. The file folder retriever retrieves selected files containing documents (thus referred to as selected documents) from the file system, identifies a document identification for each document in such files, and stores the documents in those files into a document buffer. In an alternative implementation, the file folder retriever may store in the document buffer pointers to the documents in the selected files rather than the documents themselves. The selected files preferably are user-selected, and thus the documents therein are also user-selected.

In one embodiment, the linguistic topic analyzer linguistically analyzes the selected documents to dynamically generate a data structure including topics and topic modifiers, such data structure referred to as a topic tree data structure. In one implementation of such embodiment, such topic tree data structure also includes occurrence records related to such topics and topic modifiers. The term "occurrence record" refers to a record that includes a direct or indirect pointer to the location of a document, and, in some implementations, to the location in such document of a grammatical unit, that gave rise to a topic or topic modifier.

In one embodiment, the linguistic topic analyzer also dynamically assigns weights to each of the topics and topic modifiers, such weights generally representing the importance of the topic or topic modifier as measured by the linguistic relevance of the topic in the text, the frequency of its occurence, or other factors. In one embodiment, the linguistic topic analyzer also represents the linguistic content of some grammatical units by predefined special topics; that is, topics that are not dynamically generated but, rather, represent predefined commonly used categorizations, such as "organizations," or "people."

In one embodiment, the display manager includes a topic list generator, a topic list filter, a topic index generator, and a document list generator. In one implementation, the topic list generator links topics and topic modifiers stored by the linguistic topic analyzer in the topic tree data structure so that such topics are linked by weight, preferably in descending order. In alternative implementations, such order may be alphabetical or be based on other criteria. In one implementation, the topic list filter stores in a topic list those of such linked topics that are contained in documents written in a user-selected natural language. The topic index generator indexes the topics stored in the topic list so that they may be displayed, preferably in a hierarchical manner, such as a tree-type graphical user interface. In one implementation, the document list generator stores in a document list those document identifiers and topics corresponding to documents written in a user-selected natural language.

In one embodiment, the GUI generator accesses the document list to generate a display, preferably one that includes a graphical user interface. Such graphical user interface, in one implementation, includes a window, referred to as a document window, that includes document entries including document identifiers. In one aspect, each such document entry also includes an associated list of topics representing the linguistic content of the document represented by such entry's document identifier. In one embodiment, such display also includes a second window, referred to as a topic tree window, that includes a hierarchical representation of such topics. In one implementation, such hierarchical representation includes a collapsible and expandible, tree-like graphical structure of topics, referred to herein as a "topic tree."

In one embodiment, such hierarchical representation is a single merged representation of topics that represents the linguistic content of the user-selected documents taken as a whole. In an alternative embodiment, such hierarchical representation is a single merged representation of topics that represents the linguistic content of the associated lists of topics as a whole, each such associated list of topics, as noted, representing the linguistic content of a document. In some implementations, either of such single merged hierarchical representations includes a collapsible and expandible, tree-like graphical structure of merged topics, referred to herein as a "merged topic tree." In a further implementation of either of such embodiments, such merged topic tree only includes topics that represent the linguistic content of documents written in one or more user-selected natural languages.

In one embodiment, the interface manager and display manager enable a user to display the text of one or more documents by selecting one or more document identifiers in the document window, or one or more topics in the topic tree window. In one implementation, if the user selects one or more topics from the list of topics in a document entry in the document window, or from the topics in the topic tree window, the texts of the document or documents corresponding to such selected topic or topics are displayed, and the grammatical units corresponding to the selected topic or topics are highlighted.

The linguistic filter of the present invention thus provides a display that advantageously enables a user efficiently and intuitively to select, filter, or browse through a group of selected documents based on the selection of one or more topics representing the linguistic content of one or more of the selected documents. Advantageously, each such topic is displayed in relation to other topics; that is, displayed so as to indicate the relative linguistic importance of such topics or to indicate any hierarchical relationship among them, or both.

BRIEF DESCRIPTION OF THE DRAWINGS

The above and further advantages of the invention will be more clearly appreciated from the following detailed description when taken in conjunction with the accompanying drawings. In the drawings, like reference numerals indicate like structures or method steps, and the leftmost one or two numbers of a reference numeral indicate the number of the figure in which the referenced element first appears. Solid arrows indicate control flow, while dotted arrows indicate data flow. In the drawings.

DETAILED DESCRIPTION

Figure 1:
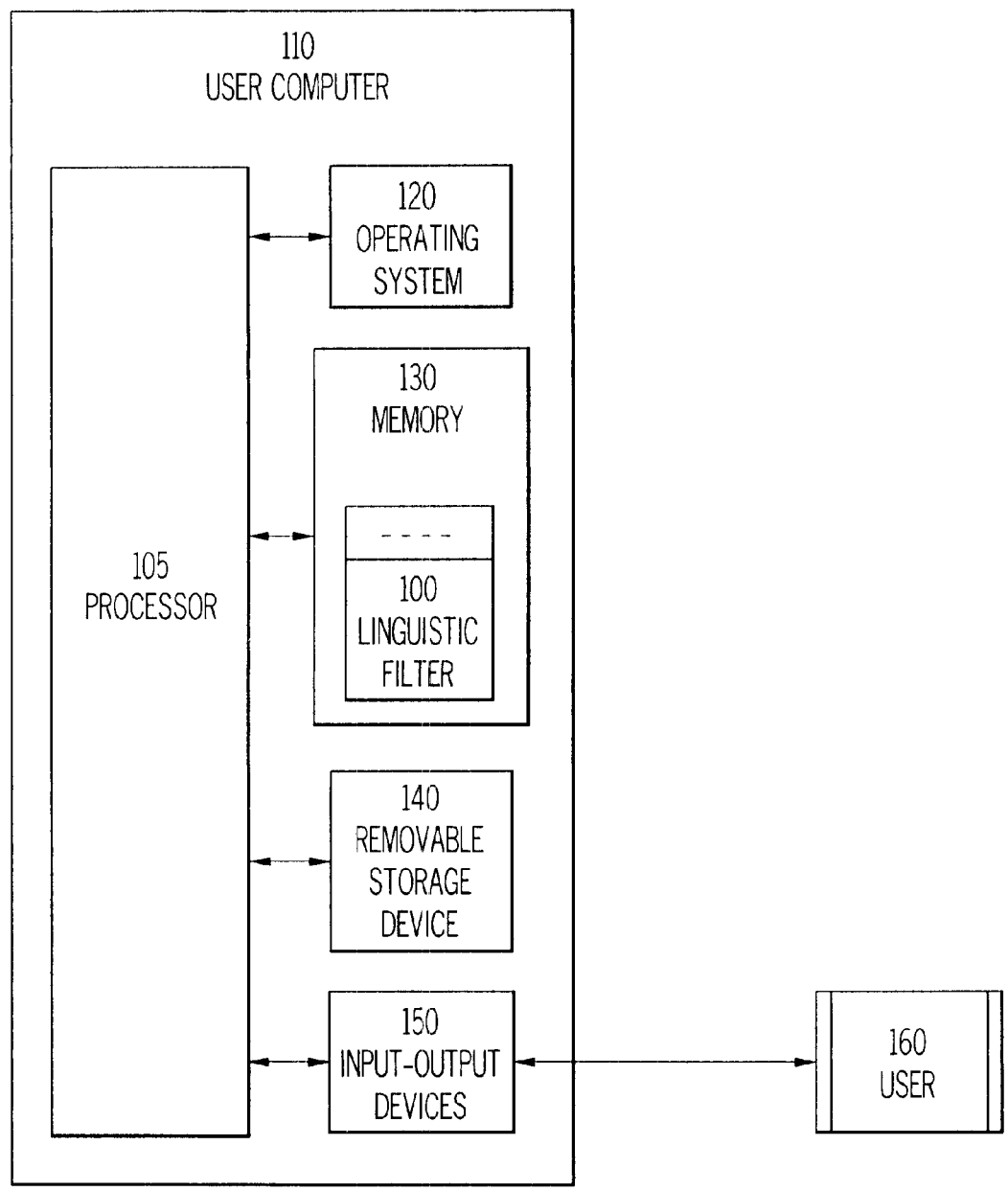
FIG. 1 is a functional block diagram of a computer system in which one embodiment of the linguistic filter of the present invention is implemented.

The attributes of the present invention and its underlying method and architecture will now be described in greater detail in reference to one embodiment of the invention, referred to as linguistic filter 100, aspects of which are represented in FIGS. 1 through 16. FIG. 1 is a functional block diagram of one embodiment of a computer system on which linguistic filter 100 is implemented.

In this detailed description, references will be made to various functional modules of the present invention that may be implemented either in software, hardware, firmware, or any combination thereof. For convenience of illustration, references generally will be made to implementations in software. Such references therefore typically will refer to software modules that will be understood to comprise a set of software instructions that cause described functions to be performed. It will be understood by those skilled in the relevant art that such functions typically are performed by the central processing unit (CPU) of the computer system executing such software instructions, typically in cooperation with the operating system of the computer system. Henceforth, the fact of such cooperation among the CPU, the operating system, and the modules of the invention, whether implemented in software, hardware, firmware, or any combination thereof, will therefore not be repeated. The computer system that implements the present invention is referred to herein as the "user computer," although it will be understood that such term is intended to include any type of computing platform, whether or not operated by a user.

User computer 110 may be a personal computer, network server, workstation, or other computer platform now or later developed. User computer 110 may also be a device specially designed and configured to support and execute the functions of linguistic filter 100 as described below. User computer 110 includes known components including processor 105, operating system 120, memory 130, removable storage device 140, and input-output devices 150. It will be understood by those skilled in the relevant art that there are many possible configurations of the components of user computer 110 and that some components that may typically be included in user computer 110 are not shown, such as a video card, data backup unit, cache memory, and many other devices.

Processor 105 may be a commercially available processor such as the PA-RISC Powered processor made by Hewlett-Packard Company, the SPARC® processor made by Sun Microsystems, Inc., the 68000 series microprocessor made by Motorola, Inc., the Alpha processor made by Digital Equipment Corporation, or it may be one of other processors that are or will become available. Processor 105 executes operating system 120, which may be, for example, the NetWare operating system available from Novell, Inc.; the DOS, Windows 3.1, Windows for Work Groups, Windows 95, or Windows NT operating system from the Microsoft Corporation; the System 7 operating system from Apple Computer, Inc.; the Solaris operating system from Sun Microsystems, Inc.; a Unix®-type operating system available from many vendors such as Sun Microsystems, Inc., Hewlett-Packard Company, or AT&T; the freeware version of Unix known as Linux; or a future operating system. Operating system 120 interfaces with firmware and hardware in a well-known manner, and facilitates processor 105 in coordinating and executing the functions of the other components of user computer 110.

Memory 130 may be any of a variety of known memory storage devices or future memory devices, including, for example, any commonly available random access memory (RAM), other magnetic medium such as a resident hard disk, or other memory storage device using other than magnetic medium. Removable storage device 140 may be any of a variety of known or future devices, including a compact disk drive, a tape drive, a removable hard disk drive, or a diskette drive. Such types of removable storage device 140 typically reads from, and/or writes to, a program storage device (not shown) such as, respectively, a compact disk, magnetic tape, removable hard disk, or floppy diskette. Any such program storage device may be a computer program product. As will be appreciated, such program storage devices typically include a computer usable storage medium having stored therein a computer software program and/or data.

Computer software programs, also called computer control logic, typically are stored in memory 130 and/or the program storage device used in conjunction with removable storage device 140. Such computer software programs, when executed by processor 105, enable user computer 110 to perform the functions of the present invention as described herein. Accordingly, such computer software programs may be referred to as controllers of user computer 110.

In one embodiment, the present invention is directed to a computer program product comprising a computer readable medium having control logic (computer software program) stored therein. The control logic, when executed by processor 105, causes processor 105 to perform the functions of the invention as described herein. In another embodiment, the present invention is implemented primarily in hardware using, for example, a hardware state machine. Implementation of the hardware state machine so as to perform the functions described herein will be apparent to those skilled in the relevant arts.

Input devices of input-output devices 150 could include any of a variety of known devices for accepting information from a user, whether a human or a machine, whether local or remote. Such devices include, for example a keyboard, mouse, touch-screen display, touch pad, microphone with a voice recognition device, network card, or modem. Output devices of input-output devices 150 could include any of a variety of known devices for presenting information to a user, whether a human or a machine, whether local or remote. Such devices include, for example, a video monitor, printer, audio speaker with a voice synthesis device, network card, or modem. Input-output devices 150 could also include any of a variety of known removable storage devices, including a CD-ROM drive, a tape drive, a removable hard disk drive, or a diskette drive.

Linguistic filter 100 is implemented in the illustrated embodiment in the "C" and "C++" programming languages, although it will be understood by those skilled in the relevant art that many other programming languages could be used. Also, as noted, linguistic filter 100 may be implemented in any combination of software, hardware, or firmware. In one illustrated embodiment, linguistic filter 100 is described in terms of a computer program executing within user computer 110. In a software implementation, linguistic filter 100 typically is loaded by processor 105 into memory 130 through an input device of input-output devices 150. Thus, linguistic filter 100 typically resides in memory 130, although it will be understood that, in alternative implementations of such software embodiment, linguistic filter 100 may also, or exclusively, reside in a separate memory (such as separate cache memory, not shown). Linguistic filter 100 may also reside in a program storage device accessible through removable storage device 140. In alternative embodiments in which linguistic filter 100 is implemented in either software, hardware, firmware, or any combination or one thereof, linguistic filter 100 may not reside completely or at all in memory 130. For clarity, however, linguistic filter 100 is shown in the illustrated embodiment as residing in memory 130.

The linguistic filter of the present invention operates upon one or more file systems (hereafter, simply file system). As the term is used herein, a file system will be understood to refer to a collection of files. Such a collection typically is organized hierarchically by directories and subdirectories, each of which may include folders and subfolders. The files may be located within such directories, subdirectories, folders, or subfolders. Such files may include natural language documents such as electronic mail, word processing documents, and the like. Hereafter, the term "document" will be understood to mean such a natural language document in a file system. Files may also include other types of information such as spreadsheets, drawings, graphics, and many others. A file may also be linked to an attached file in a known manner. It will be understood that references herein to a document are intended to include both such document and any attachments thereto that are themselves natural language documents.

The linguistic filter of the present invention typically accesses either a local file system, or a remote file system, or both, in order dynamically to generate and display topics representing the linguistic content of user-selected documents in the file system. A user selects one or more of such topics, preferably using a graphical user interface. The term "graphical user interface" is used herein to refer to a graphic display that presents information to a user, and by use of which a user may specify that an action be taken, such as retrieving selected files, selecting a topic, and so on. The linguistic filter also displays document identifiers corresponding to those documents that are described by one or more of the topics selected by the user. The term "dynamic" and its grammatical variants generally will be understood to mean herein that the described operation is carried out in real time and, in some instances, in response to a user-generated selection. Such an operation is in contrast to one that, for example, is carried out prior to user participation or in accordance with predetermined parameters. The term "topic" will be understood to mean a word, portion of a word, symbol, group of words or symbols, or other representation of the linguistic content of a natural language text, or portion thereof, to which such topic refers.

The linguistic filter of the present invention thus advantageously enables a user to efficiently and intuitively select, filter, or browse through a group of selected documents based on their linguistic content. Advantageously, such documents may be user-selected. Preferably and advantageously, such linguistic content used for selecting, filtering, or browsing includes the language in which the selected documents are written. In one embodiment, such selecting, filtering, or browsing is done by displaying to a user a graphical user interface including a topic tree window and a document window. Preferably, the topic tree window includes a hierarchical, collapsible and expandable, tree-like graphical structure of topics, referred to herein as a topic tree. Preferably, each topic therein is weighted and selectively displayed by its importance as measured by the linguistic relevance of the topic in the document, or collection of documents, to which it refers; the frequency of its occurence; or other factors. Typically, and advantageously, such linguistic relevance is based on a full linguistic analysis including morphological, syntactical and semantic analysis.

Preferably and advantageously, each such topic is also so analyzed and displayed in relation to other topics in the same document or, most preferably, in all of the user-selected documents. In such most preferable embodiments, the displayed topics in the topic tree are merged topics representing in a hierarchical arrangement the linguistic content of the group of selected documents as a whole. Such topic tree of merged topics is referred to herein as a merged topic tree.

Advantageously, in all embodiments in which topics are analyzed and displayed in relation to other topics, the linguistic filter of the present invention displays the resulting topic tree so that a user may efficiently and intuitively identify a topic as being a subtopic (i.e., modifier) of a superior topic, or as being a superior topic of a subordinate (i.e., modified) topic. Therefore, a user may efficiently and intuitively identify topics in accordance with their importance in the selected documents and also with knowledge of the relationships among such topics.

Also advantageously, such document window of such graphical user interface preferably includes document identifiers that represent such selected documents. Such document identifiers may, for example, be the subject lines or titles of documents. Preferably, such document window also includes topics representing the linguistic content of each of the selected documents. Preferably, such topics are arranged in order of importance. Most preferably, each such document identifier is arranged in relation to those of such topics representing the linguistic content of the document represented by such document identifier. Thus, a user may efficiently and intuitively identify the most important topics associated with each displayed document, as represented typically by a document identifier, in the document window.

A user may select one or more of the displayed topics, as preferably displayed in a merged topic tree, and the linguistic filter of the present invention advantageously identifies the documents represented by the selected topics. Preferably, such identification includes the display of document identifiers, and may also include such documents themselves, or portions thereof. Advantageously, a user may, in one embodiment, select such displayed topics by applying boolean expressions thereto, and the linguistic filter of the present invention identifies the documents represented by such selected topics. In one embodiment, such selection includes a condition that a document is so identified only if the hierarchical level of the user-selected merged topic matches the hierarchical level of such topic as it represents such document. Thus, for example, if a user selects subtopic B that is a subtopic to superior topic A in the merged topic tree, then document 1 is so identified by the linguistic filter of the present invention only if subtopic B is also a subtopic to superior topic A in document 1.

Thus, the linguistic filter of the present invention displays to a user representations of those documents of the selected documents that are represented by topics selected by a user in a variety of ways or combinations. Advantageously, such displays are filtered; that is, only those documents are represented that satisfy the conditions that a user imposed by selecting particular topics or such combinations of topics. Thus, a user may efficiently, intuitively, and flexibly identify selected ones or sub-groups of documents from among a larger group of documents. Advantageously, such identification is made based on topics dynamically and automatically generated by the linguistic filter of the present invention.

Preferably, such identification also includes the display of the text of such identified documents. Most preferably, such identification and display also includes highlighting of the portions of such text that gave rise to the selected topics. Typically, such displays of text are generated by the linguistic filter of the present invention in response to the selection by user 100 of a displayed document identifier or a topic listed in relation to such document identifier. Advantageously, the linguistic filter of the present invention thus enables a user efficiently and intuitively to browse through a group of documents to read or access the texts, or portions thereof, related to user-selected topics.

Figure 2A:
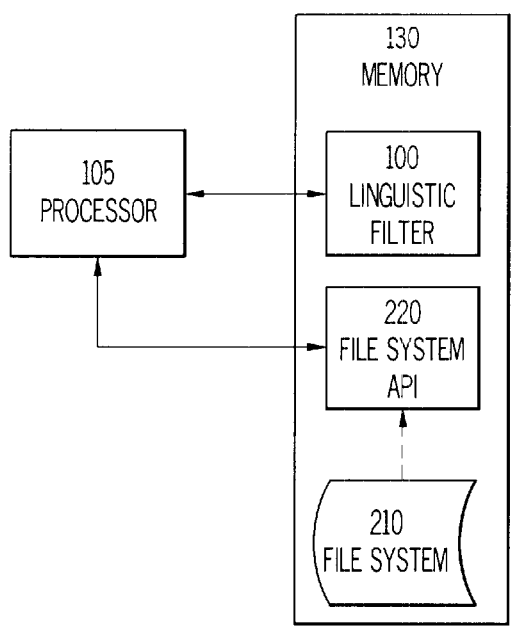
FIG. 2A is a schematic block diagram including a local file system upon which the linguistic filter of the present invention operates in one embodiment.

FIG. 2A is a schematic block diagram including a local file system upon which linguistic filter 100 operates in the illustrated embodiment. File system 210 is referred to herein as a local file system because it is located within memory 130 of user computer 110. Also typically stored in memory 130 in the illustrated embodiment is one of a variety of known computer programs known as application program interfaces (API's). File system API 220 is one such known program that provides an interface in a known manner between linguistic filter 100 and file system 210 via processor 105.

Figure 2B:
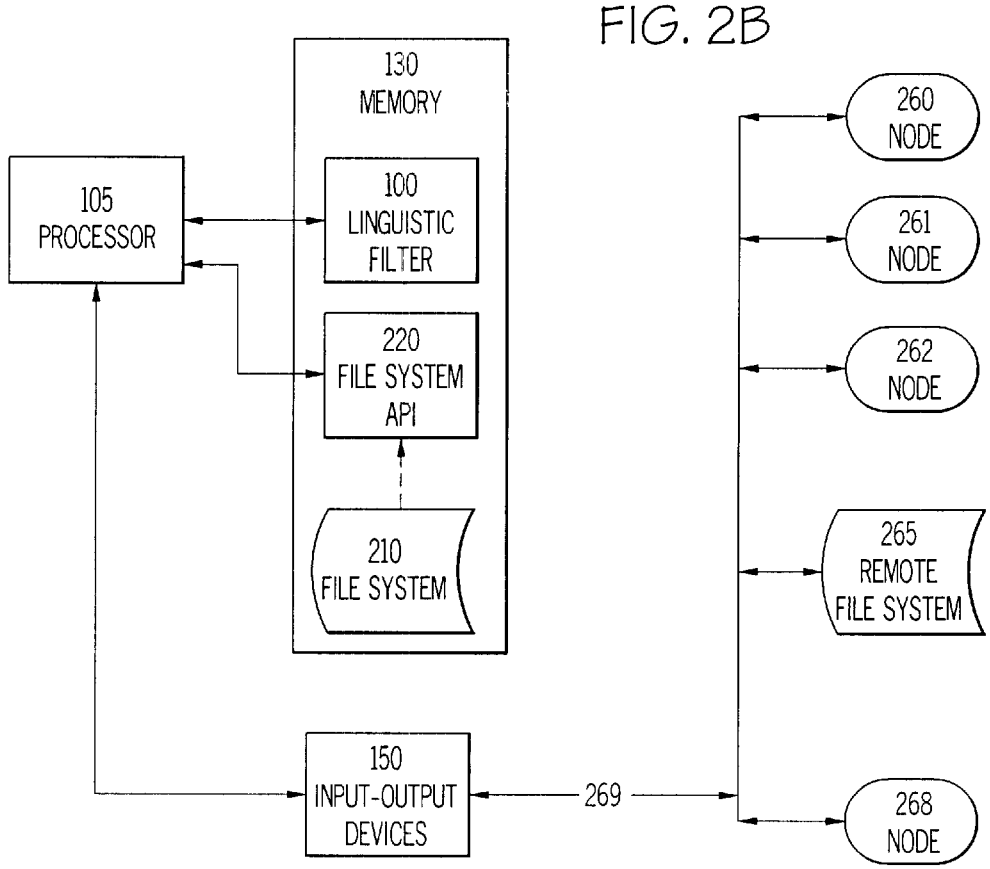
FIG. 2B is a schematic diagram including a remote file system upon which the linguistic filter of the present invention operates in an alternative embodiment.

An alternative implementation of the present embodiment is represented in FIG. 2B, in which linguistic filter 100 operates on remote file system 265, or local file system 210, or both. In a known manner, linguistic filter 100, via processor 105, accesses files in remote file system 265 through input-output devices 150 and network 269. Input-output devices 150 typically includes a network card, modem, or similar devices. Network 269 typically includes network servers, switches, and other devices (not shown), and typically is connected to many nodes, such as nodes 260, 261, 262, and 268. Any such node may include personal computers, workstations, network servers, and other computer platforms. Any such node may also be another network. A remote file system may be located in, or distributed throughout, any such node or group of nodes. Although linguistic filter 100 will hereafter be described in reference to the local file system 210 of FIG. 2A, it will be understood that the present invention in alternative implementations also operates upon remote file systems such as remote file system 265 of FIG. 2B.

Figure 3:
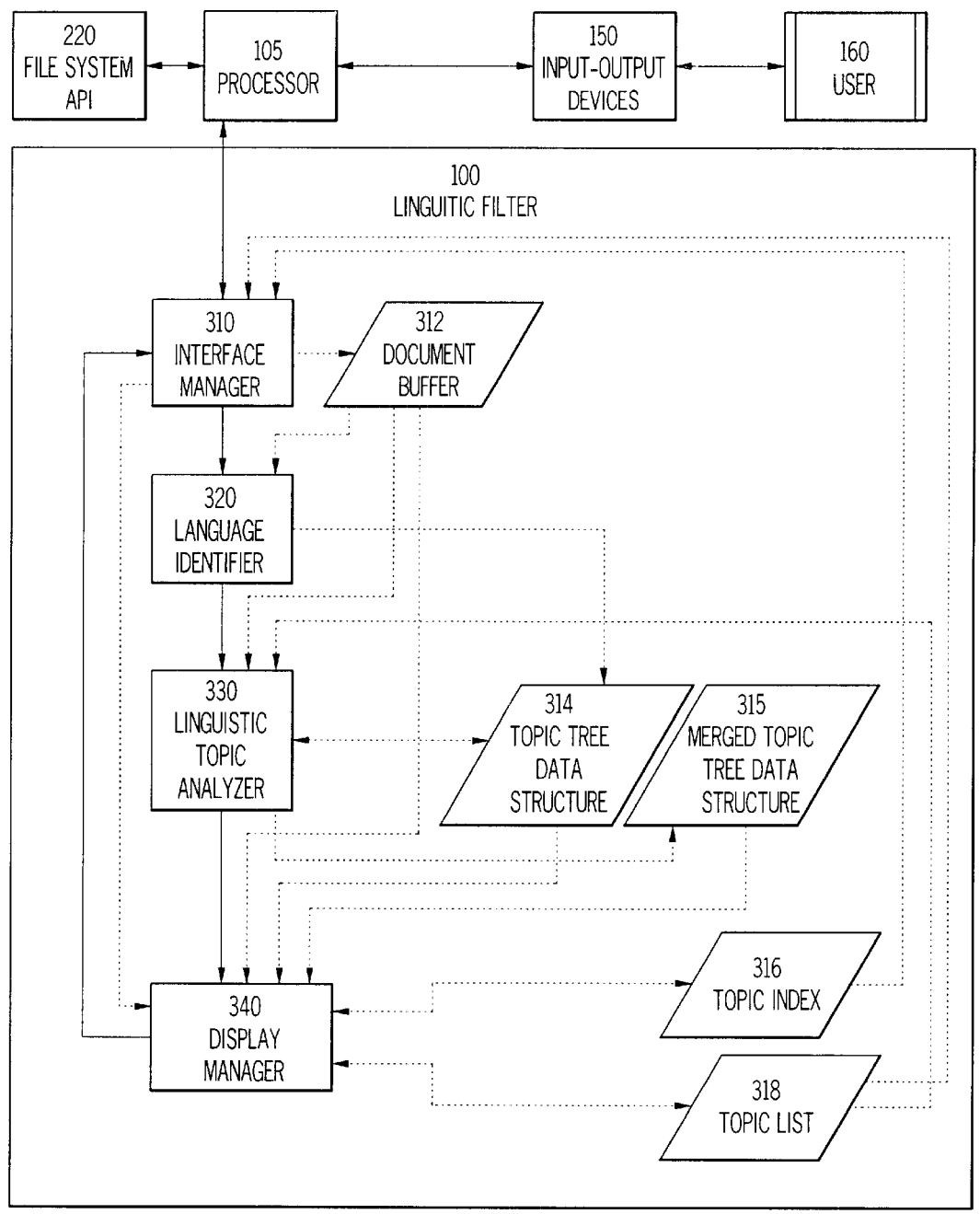
FIG. 3 is a functional block diagram of one embodiment of the linguistic filter illustrated in FIG. 1.

FIG. 3 is a functional block diagram of one embodiment of linguistic filter 100. Linguistic filter 100 includes interface manager 310, linguistic topic analyzer 330, and display manager 340, and also preferably includes language identifier 320. Interface manager 310 retrieves selected files from file system 210 and stores the documents contained in those selected files into document buffer 312. Interface manager 310 also identifies document identifiers for the documents; and generates graphical user interfaces to display the document identifiers, to display topics generated by linguistic topic analyzer 330, and to receive user selections of files or topics. Language identifier 320 identifies the natural language of the documents. Linguistic topic analyzer 330 generates the topics representing the linguistic content of the documents. Display manager 340 displays the document identifiers of those documents having a linguistic content represented by one or more user-selected topics.

Interface manager 310 will now be described in reference to the functional block diagram shown in FIG. 4, and the exemplary graphical user interface shown in FIG. 9. It will be understood that FIG. 9 is illustrative only, and that many variations are possible with respect to the style, presentation, appearance, arrangement of features, use and arrangement of icons and symbols, and other aspects of such an interface.

Figure 4:
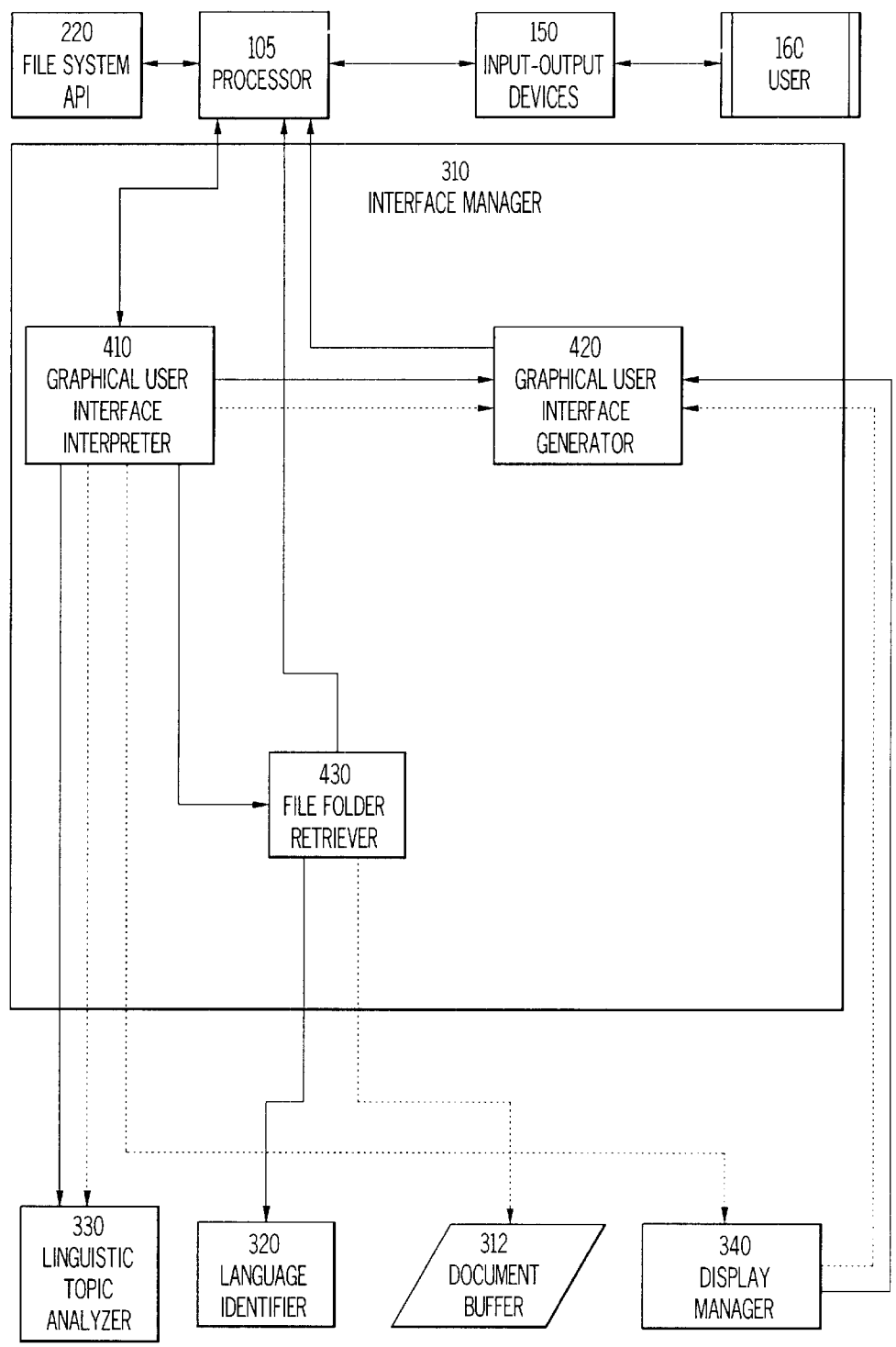
FIG. 4 is a functional block diagram of one embodiment of the interface manager of the linguistic filter of FIG. 3.

Referring to FIG. 4, interface manager 310 includes graphical user interface (GUI) interpreter 410, GUI generator 420, and file folder retriever 430. GUI interpreter 410 receives information regarding a user's selection from a graphical user interface, and directs such information to other functional modules of linguistic filter 100, including file folder retriever 430. GUI generator 420 generates graphical user interfaces for displaying information to user 160 and for enabling user 160 to make a selection from such displayed information. File folder retriever 430 retrieves selected files from file system 210, identifies a document identifier for each document in such files, and stores the documents in those files into document buffer 312.

To illustrate the functions of interface manager 310, it is assumed that user 160 issues a command to initiate linguistic filter 100. Such program initiation command is communicated via an input device of input-output devices 150, thence to processor 105, and thence to GUI interpreter 410, all in accordance with known techniques. Although it is assumed for illustrative purposes that user 160 issues such a program initiation command through a graphical user interface, it need not be so. Any of a variety of known methods for communicating such a command may be used in alternative embodiments. In a known manner, GUI interpreter 410 directs the program initiation command to GUI generator 420. GUI generator 420, employing known techniques in cooperation with file system API 220, creates the exemplary graphical user interface illustrated in FIG. 9.

Figure 9:
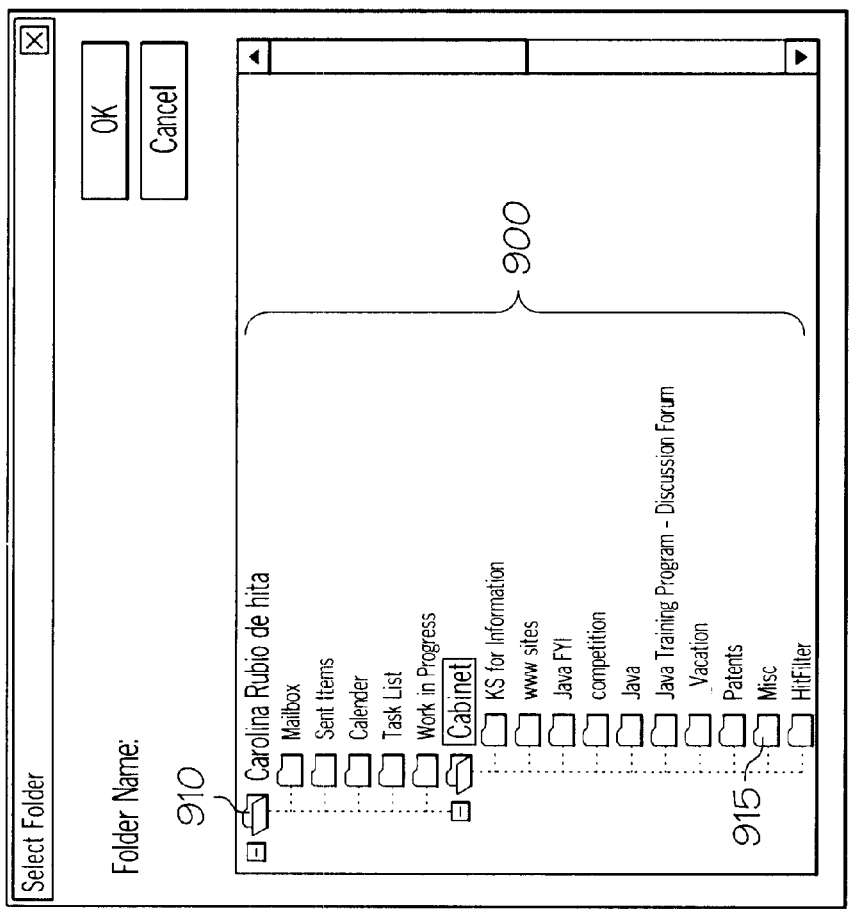
FIG. 9 shows one embodiment of a graphical user interface generated by the interface manager of FIG. 4 for selecting documents of a file system.

FIG. 9 shows a known graphical user interface 900 that represents the hierarchical organization of file system 210 and enables user 160 to select one or more directories, subdirectories, folders, subfolders, files, or documents within file system 210. As will be evident to those skilled in the relevant art, folder icons such as icon 910 may be selected by user 160 in a known manner, such as by employing a mouse to move a curser to the vicinity of icon 910 and selecting it by clicking a button on the mouse. As is also well known, such selection may, for example, cause subfolders within the selected folder, previously not displayed, to be displayed so that they may be selected in a similar manner. In such, or other, known manner, user 160 selects one or more folders, or other portions of file system 210, upon which linguistic filter 100 is to operate. For purposes of illustration, it is assumed that user 160 selects for such operation the miscellaneous subfolder represented by Misc icon 915, referred to for convenience as subfolder 915.

As noted, file folder retriever 430 retrieves the selected files in a known manner from file system 210 and stores the documents in those files into document buffer 312. In an alternative implementation, file folder retriever 430 may store in document buffer 312 pointers to the documents in the selected files rather than the documents themselves. The selected files preferably are user-selected. For example, the selection by user 160 of subfolder 915 is communicated to GUI interpreter 410 in the manner described above. GUI interpreter 410 provides such information to file folder retriever 430 that, in a known manner, communicates with processor 105 to enable file system API 220 to access the files within user-selected subfolder 915. In another implementation of the illustrated embodiment, subfolder 915 need not be user-selected. It may, rather, be a default file; i.e., one that is predetermined to be operated upon by linguistic filter 100 without the need for a user selection. Similarly, one or more directories, subdirectories, or other groups of files may be default files. In yet another implementation, subfolder 915 may automatically be selected based upon preestablished criteria.

For illustrative purposes, it will be assumed that folder 910 and its subfolders contain electronic mail documents. It will further be assumed that each electronic mail document, and any attachment to it, are text documents written in a natural language; i.e., a language typically used by people in ordinary discourse, such as English or Spanish. Such documents and attachments, if any, are hereafter referred to simply as email. It will be understood that the present invention is not so limited, and that the user-selected files may contain any kind of textual document written in a natural language, or in another type of language having grammatical, morphological, or syntactic rules, such as a computer programming language. The term "morphological" generally refers to the structure and formation of words.

Figure 5:
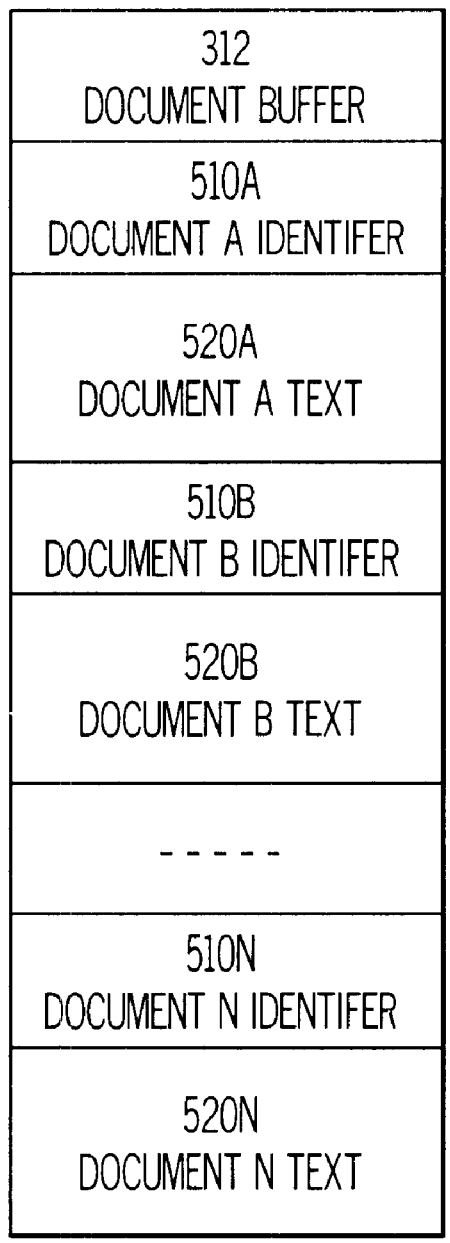
FIG. 5 is a schematic diagram of one embodiment of a document buffer into which the interface manager of FIG. 4 places selected documents of a selected file system.

FIG. 5 is a schematic diagram of one embodiment of document buffer 312, which typically is located in memory 130. Document buffer 312 holds the identifier and text of each document in an identifier field 510 and text field 520, respectively. For example, document A identifier is stored in identifier field 510A while document B identifier is stored in identifier field 510B (collectively and generally referred to as identifier fields 510). Likewise, document A text is stored in text field 520A while document B identifier is stored in text field 520B (collectively and generally referred to as text fields 520). It will be understood that there are many possible structures according to which document buffer 312 may be constructed, and that it is not material to the present invention which of such structures is used. For example, in an alternative implementation, document buffer 312 may contain the identifier and text of only one document at a time. Pointers to other documents in the selected files in such alternative implementation may be stored in document buffer 312 or another data structure.

It is assumed for purposes of illustration that, in accordance with known techniques, each email has a predefined field in which the subject of the email has been inserted. In the illustrated embodiment, the document identifier of each email is assumed to include such subject. It will be understood that, in other implementations of the illustrated embodiment, the document identifier may be otherwise determined. For example, as is well known to those skilled in the relevant art, a text document written in the HTML format typically has a title identified by special characters, such as "<title>." Such a title may be identified in accordance with known techniques and identified by file folder retriever 430 as the document identifier in one alternative embodiment. In another implementation, applicable for use with documents that do not contain such an identifying field, file folder retriever 430 may identify a first predetermined number of words in the text of the document as the document identifier. Alternatively, an arbitrary identifier may be assigned. Many other techniques for assigning an identifier to a document will be known to those skilled in the relevant art, and it is not material to the present invention which of such known techniques is employed.

Preferably, the document identifier also includes a version identifier that avoids re-processing of documents that have already been processed by linguistic filter 100. With respect to the illustrated embodiment, it is assumed for purposes of illustration that, in accordance with known techniques, each email in folder 910 has been assigned a unique number. Typically, emails are not edited once they are sent or have been received, so that there is only one version of an email. Thus, the version identifier is this unique email number. It will be understood that, with respect to other types of documents that typically may be edited, the version identifier identifies the version of the document that is, or has been, processed by linguistic filter 100. As will be evident to those skilled in the art, there are many ways in which a version of a document may be uniquely identified. For example, a document may have a date and time stamp indicating the last time that it was edited. It is not material to the present invention which of such known techniques is employed. In alternative embodiments, a version identifier need not be assigned.

For each email in subfolder 915, file folder retriever 430 retrieves the subject and version identifier from the email and stores them in document identifier field 510 for the corresponding email in document buffer 312. The text of each email is stored in the corresponding document text field 520.

As noted, linguistic filter 100 also preferably includes language identifier 320 that identifies the natural language in which a document is written. As described below, the natural language of a document is used to classify that document, and henceforth is referred to as the document's natural language classification. In other embodiments, there need not be a language identifier, and such alternative embodiments therefore typically will not include natural language classifications. In such alternative embodiments, document buffer 312 is processed by linguistic topic analyzer 330 without also being processed by language identifier 320. In the illustrated embodiment, language identifier 320 processes document buffer 312 to produce the natural language classifications of the emails of subfolder 915, and provides such natural language classifications to linguistic topic analyzer 330.

Language identifier 320 may be any system or method, presently or later developed, for identifying the language in which a natural language document is written. Preferably, language identifier 320 is the system and method described in a U.S. Patent Application entitled "SYSTEM AND METHOD FOR IDENTIFYING LANGUAGE USING MORPHOLOGICALLY-BASED TECHNIQUES," application Ser. No. 08/878,264, naming as inventor David van den Akker, and assigned to the assignee of the present invention, the specification of which is hereby incorporated by reference in its entirety. Language identifier 320 processes document identifier field 510 and document text field 520 in document buffer 312 and thereby identifies the natural language of each document in document buffer 312. With respect to the illustrative example of subfolder 915, language identifier 320 thus identifies a natural language classification for each email in subfolder 915.

Functions and methods employed by linguistic topic analyzer 330 are described in a U.S. Patent Application entitled "NATURAL LANGUAGE INFORMATION RETRIEVAL SYSTEM AND METHOD," application Ser. No. 08/916,628, naming as inventors Carolina Rubio de Hita, David van den Akker, Erik C. E. Govaers, Frank M. J. Platteau, Kurt Van Deun, Melissa MacPherson, Peter De Bie, and Sophie Laviolette, and assigned to the assignee of the present invention, the specification of which is hereby incorporated by reference in its entirety. Linguistic topic analyzer 330 linguistically analyzes the selected documents to dynamically generate a data structure including head topics and topic modifiers, defined below. Such data structure also includes occurrence records related to such topics and topic modifiers. In the illustrated embodiment, linguistic topic analyzer 330 generates two such data structures, topic tree data structure 314 and merged topic tree data structure 315, shown in FIGS. 6 and 7, respectively, and described below. Such linguistic analysis preferably includes morphological, syntactical and semantic analysis.

The term "topic modifier" generally refers to a word or group of words that linguistically modifies a head topic. Such topic modifier typically serves as a subtopic of the head topic that it modifies. A topic modifier may be further modified by another topic modifier, to produce a sub-subtopic of the head topic. The term "head topic" refers either to a topic that is modified by a topic modifier, or a topic that stands without such modification; i.e., a topic that is not a topic modifier. The term "occurrence record" refers to a data entry specifying the location of a grammatical unit in the document being analyzed, the content of which is represented by a head topic or topic modifier associated with such occurrence record. An occurrence record typically includes a base address of the start of the document, an offset to the start of the grammatical unit, and the length of the grammatical unit. In an alternative implementation, such base address may be pointed to by a pointer that is stored in the occurrence record. Any of a variety of other known methods for specifying the location of the grammatical unit may be used in other embodiments. In general, the grammatical unit may be a word, phrase, sentence, paragraph, page, portion of the preceding, or other block of natural language text from the document being analyzed.

Linguistic topic analyzer 330 also preferably assigns weights to each of the head topics and topic modifiers. As noted, such weight generally represents the importance of the head topic or topic modifier as measured by the linguistic relevance of the topic in the text, the frequency of its occurence, or other factors. For example, a head topic that represents the content of a grammatical unit that is determined to be part of the title of a document, and therefore presumed to be important, is typically assigned a heavier weight than the same head topic would have received if it had not been associated with a title.

Figure 6A:
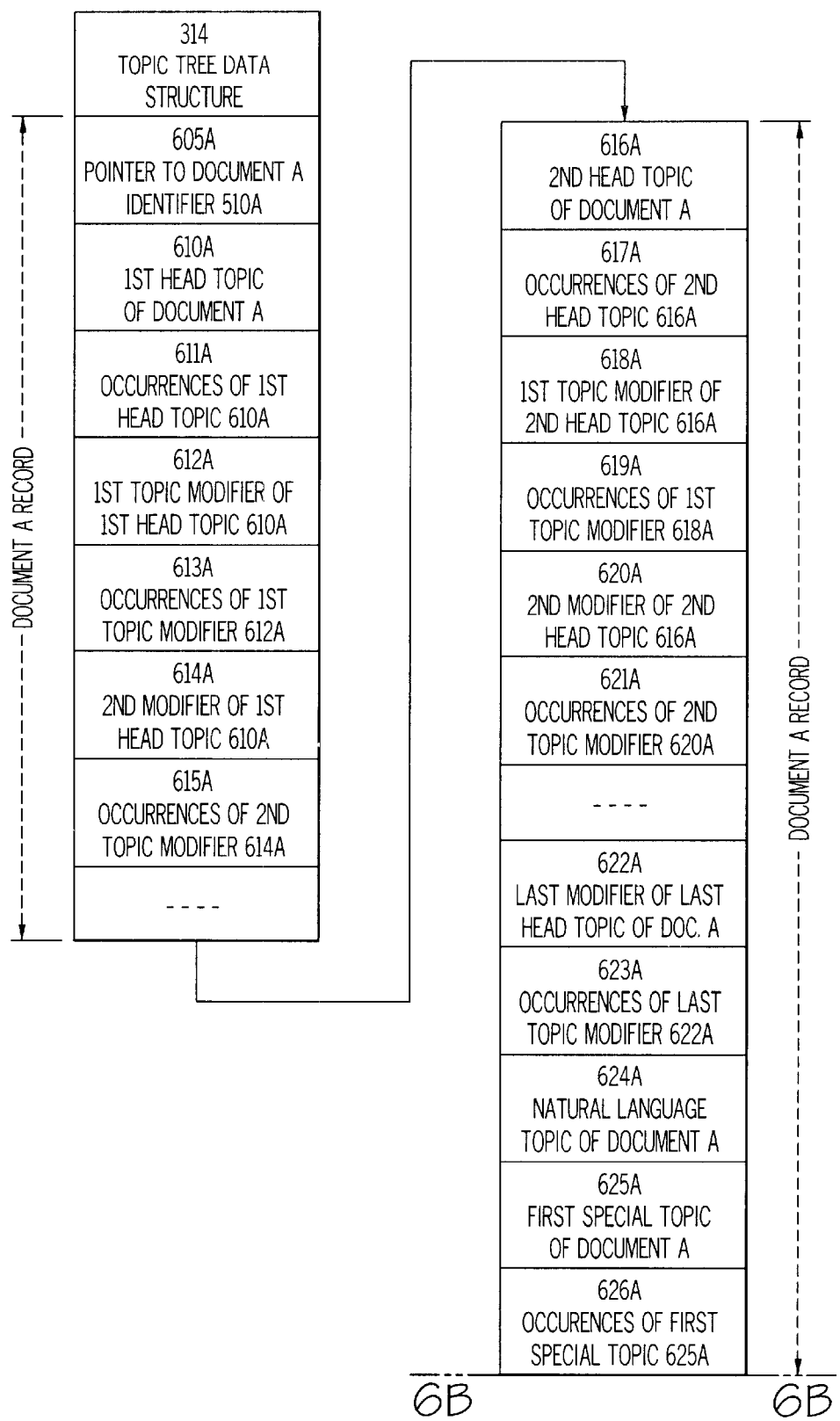
FIG. 6 is a schematic diagram of one embodiment of a topic tree data structure into which one embodiment of a linguistic topic analyzer of the linguistic filter of FIG. 1 places topics and related data.
Figure 6B:
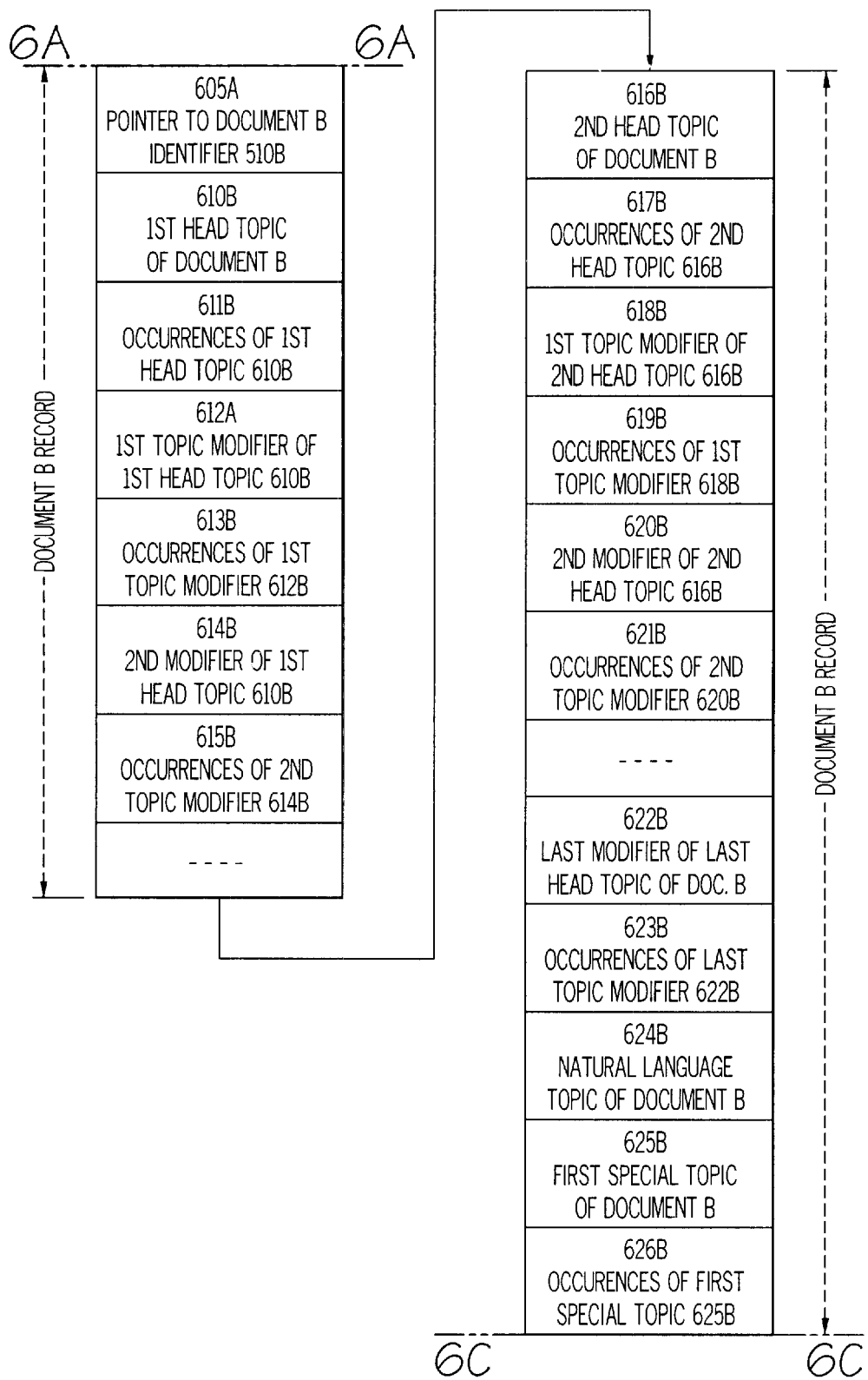
Figure 6C:
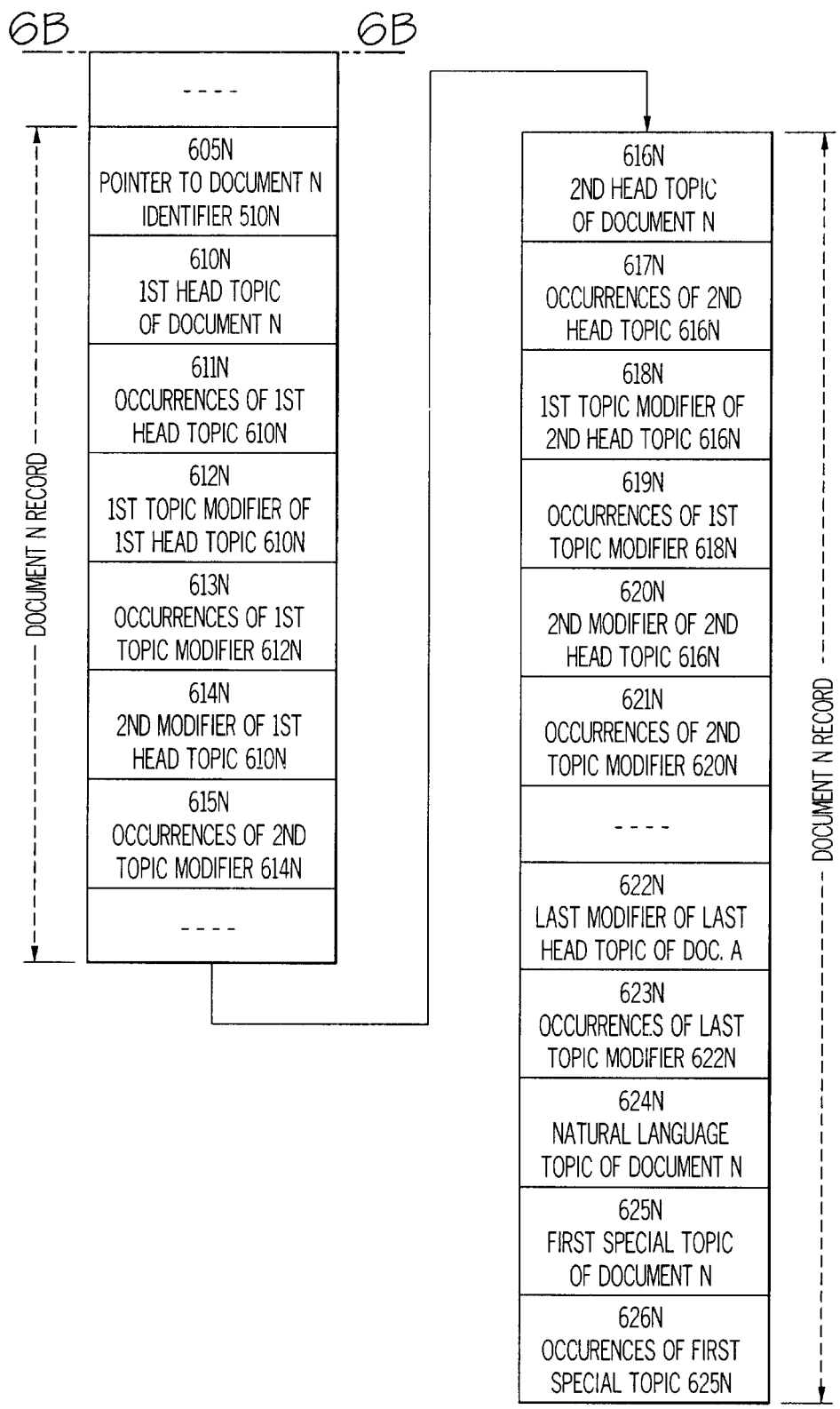

Referring to the present illustrative example, linguistic topic analyzer 330 thus applies morphological, syntactical and semantic analysis to each of the emails in subfolder 915 as stored in document buffer 312. Based on such analysis, topic analyzer 330 dynamically generates weighted head topics and topic modifiers representing the content of grammatical units in such emails, together with their associated occurrence records. FIG. 6 is a schematic diagram of one embodiment of topic tree data structure 314 into which linguistic topic analyzer 330 stores such weighted topics. Topic tree data structure 314 typically is located in memory 130. It will be understood that such topic tree data structure may be implemented in accordance with many other designs for storing data, and that it is not material to the present invention which such design is employed.

As shown in FIG. 6, topic tree data structure 314 holds information related to each of the documents, A through N, stored in document buffer 312. For convenience, such information is referred to as being stored in fields of a document record. For example, a pointer to the document A identifier in document buffer 312 is stored in pointer field 605A of the document A record, while a pointer to the document B identifier in document buffer 312 is stored in pointer field 605B of the document B record (such fields collectively and generally referred to as identifier pointer fields 605). Likewise, a first head topic identified by linguistic topic analyzer 330 with respect to document A is stored in first head topic field 610A, while the first head topic so identified with respect to document B is stored in first head topic field 610B (collectively and generally referred to as first head topic fields 610). In the same manner, the occurrence records for occurrences of such first head topics are stored in occurrences of first head topic fields 611. The first modifier topic of the first head topic is stored in fields 612, and the occurrence records for occurrences of such modifier topics are stored in fields 613. Second and subsequent head topics, occurrence records for each such head topics, first and subsequent modifier topics of each such head topics and their occurence records, modifier topics of modifier topics and their occurrence records, and so on, are similarly stored in topic tree data structure 314, as partially shown in FIG. 6. A head topic or topic modifier may have more than one occurrence record because more than one grammatical unit may give rise to the same head topic or topic modifier.

Linguistic topic analyzer 330 also preferably represents the linguistic content of some grammatical units by certain predefined, special, head topics and topic modifiers, referred to hereafter simply as special topics and special topic modifiers. Special topics and special topic modifiers advantageously are associated with entries in a morphosyntactic dictionary. For illustration, it is assumed that the word "Novell" appears in one or more of the documents A through N stored in document buffer 312. It is further assumed that such word corresponds to an entry in the morphosyntactic dictionary that identifies such word as being represented by the special head topic "organizations," and by the special topic modifier "companies" under such head topic. Thus, the word "Novell" is determined by linguistic topic analyzer 330 to be a special topic modifier of the special topic modifier "companies" of the special head topic "organizations." That is, "Novell" is a sub-subtopic of the topic "organizations" under its subtopic "companies." Preferably, the word "Novell" also is analyzed by linguistic topic analyzer 330 in the same manner as other words in the selected documents so that it, alone or with other words in a grammatical unit, may be determined to be a head topic or topic modifier, as described above. In like manner, the word "university" may be associated with the special topic "organizations" and the topic modifier "academic" and also constitute, or be part of, a head topic or topic modifier. Similarly, the proper noun "Carolina" may be associated with, for example, the special topic "people," and also constitute, or be part of, a head topic or topic modifier.

Also, predetermined special characters, such as numbers or symbols, preferably are identified with special topics. For example, the character "@" is identified as being commonly associated with an electronic address. A grammatical unit associated with such character, such as "carolina @novell.com," therefore may be represented by the special topic modifier "email addresses" under the special topic "people." Preferably, such grammatical unit may also constitute, or be part of, a head topic or topic modifier.

In the illustrated embodiment, such special topics and special topic modifiers, if associated with grammatical units in one or more of the selected documents A through N, are stored by linguistic topic analyzer 330 in topic tree data structure 314. Thus, fields 625 and 626 in FIG. 6 respectively represent the storage of a special topic and its occurrence records in topic tree data structure 314 for an illustrative example in which there is only one special topic and no special topic modifiers for the illustrative documents. In alternative embodiments, there need not be such storage of special topics as separate entries. For example, in an alternative embodiment, any head topic or topic modifier may have an associated "attribute," (not shown) including special topics such as "companies," "people," and so on, as described in the '628 application. In such alternative embodiment, such attributes may be associated in topic tree data structure 314, or similar data structure, with each head topic or topic modifier that has such attributes, rather than being stored as separate, special topics as in the illustrated embodiment.

In the illustrated embodiment, the natural language classifications identified by language identifier 320 with respect to documents A through N preferably also are stored in topic tree data structure 314. Such storage is represented by fields 624. Typically, a natural language classification identifies the corresponding document in its entirety, rather than a particular portion thereof, because a document typically is written in only one natural language. Therefore, an occurrence record is not typically required for a natural language classification. However, it need not be so in another embodiment, in which one language may be identified with respect to one portion of a document and another language with respect to another portion. Any one of a variety of known techniques advantageously may be used to mark natural language classifications, special topics, and special topic modifiers so that they may be identified and distinguished from head topics and modifier topics by topic list filter 820, as described below.

Each entry of a head topic, modifier topic, natural language classification, special topic, or special topic modifier (hereafter collectively referred to as topics) with respect to each document is linked to succeeding entries of the same type, if present in the same document, and head topics are linked to their topic modifiers. Also, each of such topics is linked to its occurrence records. For example, block 610A containing the first head topic of document A contains a link, or pointer, to the location in topic tree data structure 314 of another head topic of document A, as well as to the first occurrence record of that first head topic and to the first modifier topic of that head topic. The first such occurrence record is linked to the second such occurrence record, and so on. The first such modifier topic is linked to the second such modifier topic, and so on, and each modifier topic is linked to its occurrence records.

Thus, all topics and occurrence records relating to all documents A through N of subfolder 915 are identified by following such linkages in topic tree data structure 314. Such linked information in topic tree data structure 314, as well as document information stored in document buffer 312, are operated upon by display manager 340, as will now be described.

Figure 8:
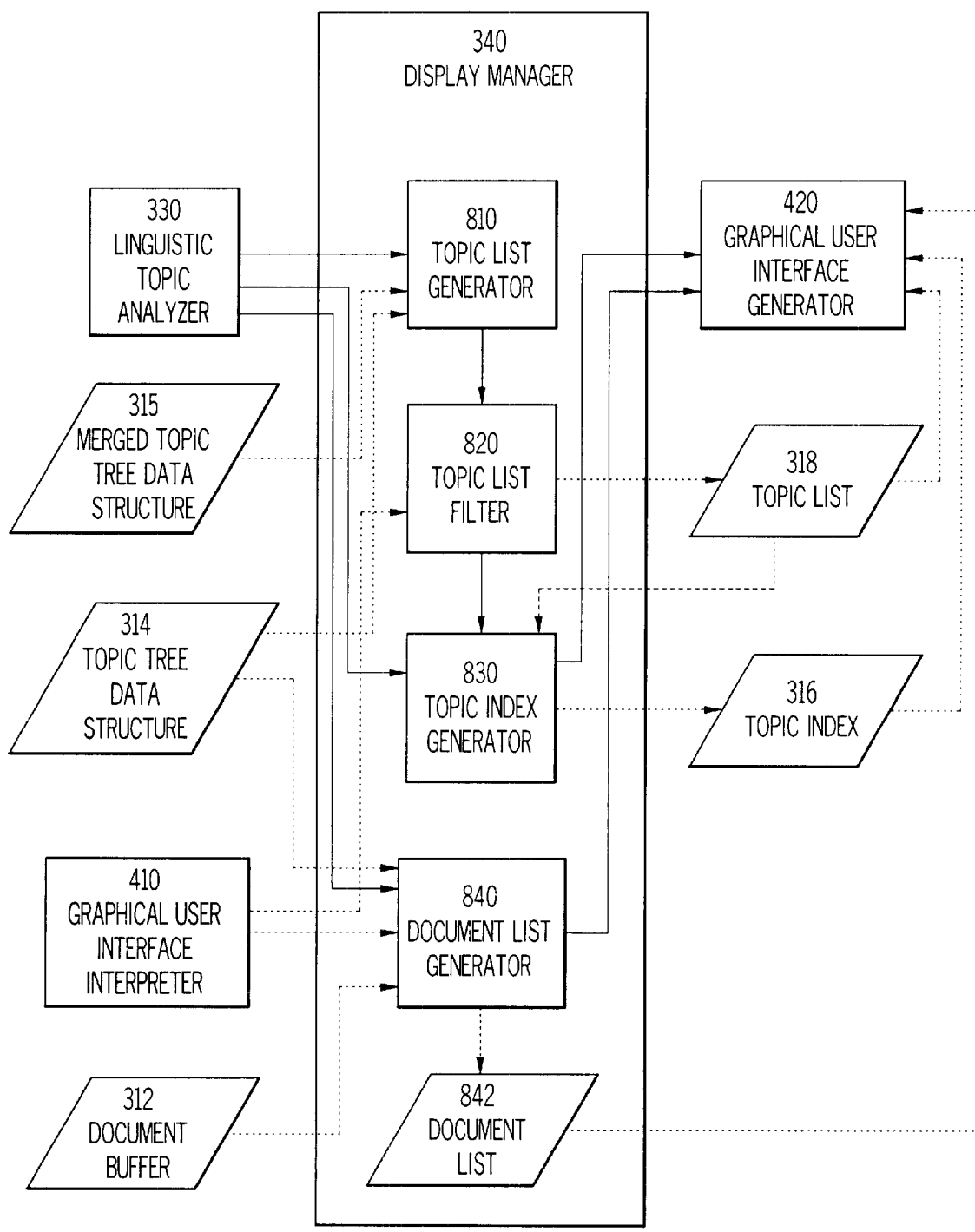
FIG. 8 is a functional block diagram of one embodiment of a display manager of the linguistic filter of FIG. 3.

FIG. 8 is a functional block diagram representing the functions of display manager 340. As noted, display manager 340 displays the document identifiers of documents having a linguistic content represented by one or more user-selected topics. For the illustrative example in which such documents are the emails of subfolder 915, such document identifiers are the subjects stored in document identifier fields 510 of document buffer 312. Display manager 340 includes topic list generator 810, topic list filter 820, topic index generator 830, and document list generator 840. Topic list generator 810 preferably establishes new linkages among the head topics and topic modifiers stored in topic tree data structure 314 so that such topics are linked in order, preferably by weight, preferably in descending order. In alternative embodiments, such order may be alphabetical or be based on other criteria. Such procedure is hereafter referred to as re-linking. Topic list filter 820 preferably stores in topic list 318 those re-linked head topics, and all of their topic modifiers, contained in documents that have natural language classifications corresponding to one or more user-selected natural languages. Topic index generator 830 indexes the topics stored in topic list 318 so that they may be displayed, preferably in a hierarchical manner, such as a tree-type graphical user interface. Such hierarchical display of topics is hereafter referred to as a topic tree. With respect to an initial display, document list generator 840 stores in document list 842 those document identifiers and topics corresponding to documents having such one or more user-selected natural language classifications. With respect to other selection displays, generator 840 stores only those of such document identifiers and topics that also correspond to documents having one or more head topics or topic modifiers that are user-selected from the topic tree.

As noted, topic list generator 810 preferably re-links topic tree data structure 314 by weight. Such re-linking, or other method of sorting, is done in accordance with any of a variety of known techniques for sorting data in a data structure. In alternative embodiments, such sorting by re-linking or other method may not take place. However, sorting by weight is advantageous because, as will be described below, such procedure enables graphical user interfaces to be displayed by which user 160 may quickly and intuitively identify the most important topics and cause only the most important topics to be displayed. In the illustrated embodiment, topic list generator 810 re-links topic tree data structure 314 so that fields 610 through 615 (hereafter collectively and generally referred to as the first head topic fields) refer to the head topics having the heaviest weight in each of their respective documents. Similarly, second head topic fields 616 through 621 refer to the head topics having the second heaviest weight in their respective documents, and so on. A similar re-linking by weight is done by topic list generator 810 for all modifier topics, so that the first modifier topic of first head topic fields 612 refer to the modifier topic having the heaviest weight among the modifier topics of the first head topic, and so on. During such re-linking, the link from each topic to its occurrence record is preserved. As noted, alternative embodiments may order topics alphabetically or by other criteria, and thus such re-linking in such alternative embodiments is done in accordance with such criteria.

As noted, topic list filter 820 preferably stores in topic list 318 those re-linked head topics, and all of their topic modifiers, contained in documents that have natural language classifications corresponding to one or more user-selected natural languages. For convenience, topics satisfying such condition are referred to as being language-compliant. User 160 makes a selection of natural languages in accordance with any of a variety of known methods. For example, user 160 may select from a graphical user interface a pull-down menu including all of the natural languages that language identifier 320 is capable of identifying. User 160 selects one or more natural languages, and such selection is provided to topic list filter 820 through GUI interpreter 410 in a known manner. Using any one of a variety of known comparison techniques, topic list filter 820 preferably excludes from storage in topic list 318 all head topics and their topic modifiers that do not have in field 624 a natural language classification corresponding to one of such user-selected natural languages. Thus, user 160 advantageously may filter out, for example, head topics and related topic modifiers that refer to emails written in a language that user 160 cannot read or does not desire to read. In the illustrated embodiment, if user 160 does not make such a selection of natural languages, then no such filtering takes place. In alternative embodiments, such filtering by natural language need not be included.

As will be evident to those skilled in the art, topic list 318 may be constructed by topic list filter 820 in accordance with any of a variety of known data structures. One such known data structure, suitable for building a collapsible and expandable hierarchical structure such as a topic tree, includes records for each display element (commonly called branch) of the tree. Such known data fields typically include: a text string representing the display element of the present record; a pointer to the next data element of the same type, i.e, head topic, topic modifier, and so on; a pointer to the previous data element of the same type; a pointer to the first "child" of the present data element, such as the modifier topic of a head topic, or the modifier topic of a modifier topic of a head topic, and so on; a status indicator that is set in a known manner to indicate such user actions as opening a folder; a pointer to an icon that optionally may be displayed to pictorially represent the text string; indicators of the size, font, color, or other attributes of the text string; and an indicator of the level of indentation to be applied.

In a known manner, topic index generator 830 advantageously generates topic index 316 from the data stored in topic list 318. Topic index 316 may be constructed in accordance with a variety of known data structures, such as one that includes a pointer to the first element to be displayed; a pointer to the last element to be displayed; a counter containing the total number of elements to be displayed; and various known indicators for displaying icons, fonts, colors, indents, and so on. As will be evident to those skilled in the art, topic index 316 facilitates the generation by graphical user interface generator 420 of a collapsible and expandable tree-type structure based on the information regarding display elements contained in topic list 318. As will be described below, such topic tree advantageously enables user 160 to filter and select topics efficiently and intuitively. However, it will be understood that many other topic-selection structures may be employed in alternative embodiments.

As noted, document list generator 840 stores in document list 842 those document identifiers and topics corresponding to documents having one or more user-selected natural language classifications. It is assumed for purposes of illustration that user 160 has selected the natural languages English and Spanish in the manner described above. Such selection is provided to document list generator 840 by GUI interpreter 410. Generator 840 accesses topic tree data structure 314. For each document represented therein, generator 840 compares the entry in natural language classification fields 624 to determine, in accordance with known means, if such entry corresponds to at least one of the user-selected natural languages, i.e., English or Spanish in the present example. If the entry does so correspond, generator 840 stores in document list 842 the document identifier for such document, as pointed to in pointer fields 605. Generator 840 also stores in document list 842, in any known manner so as to preserve the association with such document identifier, all head topics and topic modifiers for such document. As noted, such head topics and topic modifiers are stored in topic tree data structure 314 and sorted by weight. Generator 840 also stores in document list 842 a pointer to pointer field 605 of the document record in topic tree data structure 314 for each such document so that the text of such document may readily be displayed, as described below with respect to FIG. 16.

Figure 10:
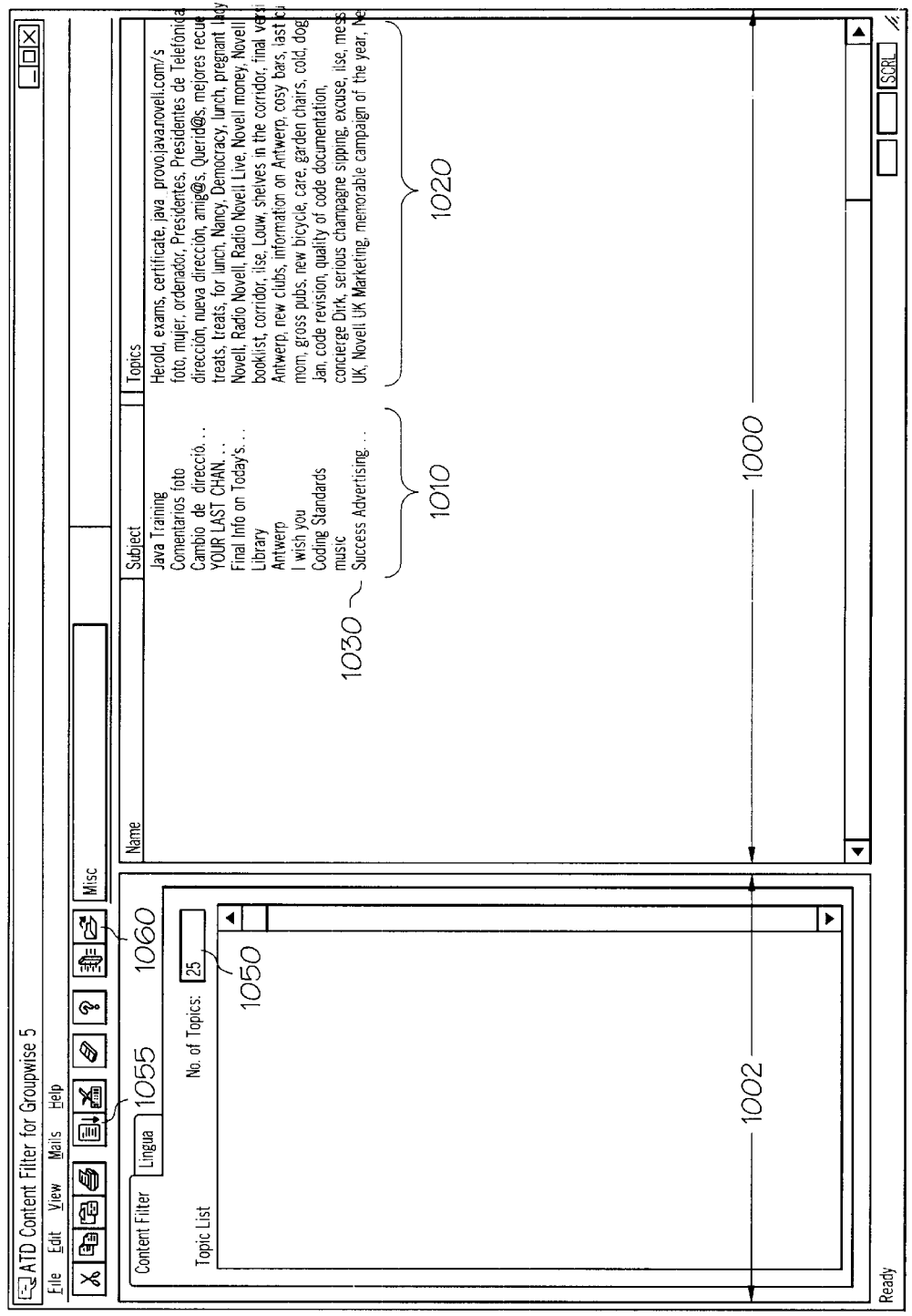
FIG. 10 shows one embodiment of an initial graphical user interface generated by the interface manager of FIG. 4 for displaying topics and document identifiers generated by the linguistic filter of FIG. 1 from the documents selected in accordance with FIG. 9.

GUI generator 420 accesses such information in document list 842 to generate in a known manner an initial display, preferably one that is a graphical user interface. FIG. 10 is an illustrative example of such initial graphical user interface, including therein portion 1000. Portion 1000, and corresponding portions of graphical user interfaces shown in FIGS. 11–15, are hereafter referred to as the document window. Document window 1000 includes a list of document entries, such as document entry 1030, each of which corresponds to a document processed by generator 420. With respect to the present example in which such documents are emails of subfolder 915, document entry 1030 therefore corresponds to one such email that has been so processed. Document identifiers 1010 consist of the subjects for each such email. Topics 1020 consist of the head topics and their topic modifiers for each such email. Preferably, such head topics and topic modifiers are displayed in order of their weight. Topics 1020 are thus displayed in one of many possible implementations, in which the most important head topic is listed first, then its topic modifiers, if any, in order of importance, then the second most important head topic, and so on. In another implementation, additional information regarding such emails, such as the name of the sender (not shown), may be stored in topic tree data structure 314 and included in document window 1000.

Also included in the initial graphical user interface of FIG. 10 is portion 1002. Portion 1002, and corresponding portions of graphical user interfaces shown in FIGS. 11–15, are hereafter referred to as the topic tree window. Included in topic tree window 1002 is graphical element 1050, commonly referred to as a text block. In accordance with known techniques, user 160 optionally enters into text block 1050 an integer that is the maximum number of head topics, M, described above. It will be understood by those skilled in the relevant art that there are many other techniques by which user 160 may enter the maximum number of head topics that the user wishes to see displayed, and it is not material to the present invention which of such techniques is employed.

Advantageously, user 160 may examine document window 1000 to determine if the documents in the user-selected file contain topics of interest. User 160 may, if desirous of including additional documents in order to expand the number of topics displayed in topics 1020, or for another reason, select additional documents. User 160 initiates such additional selection in accordance with any of a variety of known techniques, such as by selecting open-folder button 1060. Such action is processed by linguistic filter 100 in the manner described above with respect to the processing of a program initiation command. That is, GUI generator 420 creates a graphical user interface such as that shown in FIG. 9 to receive such additional selection. In the manner described above, the documents contained in the additionally selected folders are processed so that document entries are created for them in document window 1000. That is, the subjects and weighted topics of such additional documents are added to document identifiers 1010 and topics 1020, respectively.

As noted, such process typically includes the retrieval by file folder retriever 430 of all documents in the user-selected folders. However, in the case in which additional folders are selected, file folder retriever 430 preferably compares the version identifier of the document identifier of each document in such additional folders with the version identifier component of the document entries already existing in document identifier fields 510 of document buffer 312. Such comparison is undertaken in accordance with any of a variety of known methods. If a match is found, the corresponding document is not added to document buffer 312 for processing because the same version of such document has already been processed.

Also, user 160 may, by selecting a refresh folder button (not shown), or by any of a variety of other known methods, initiate a new selection of folders that may not include the folders initially selected. Such action is processed in the same manner as described above with respect to a program initiation command, and entries in document buffer 312, topic tree data structure 314, and other data structures used by linguistic filter 100 are erased or otherwise reset to an initial condition.

Preferably, topic tree data structure 314 is copied at the end of a session to create a long-term topic tree storage data structure (not shown, but substantially the equivalent of topic tree data structure 314) in non-volatile memory, typically of memory 130. The term "session" refers to a usage of linguistic filter 100 that is terminated. Thus, for example, user 160 may invoke linguistic filter 100 for a session at one time, terminate such session, and again invoke linguistic filter 100 at a subsequent session at a subsequent time. Such copying to non-volatile memory is undertaken so that documents processed by linguistic filter 100 are available in topic tree data structure 314 from one session to another. In such embodiment, such long-term structure may optionally be identified in a known manner with the selected files from which it was derived. Multiple copies of such long-term structure therefore typically exist for multiple files processed by linguistic filter 100.

Thus, for example, user 160 may select subfolder 915 for processing by linguistic filter 100 during one session. Typically at the end of such session, or if user 160 desires to apply linguistic filter 100 to a portion of file system 210 not including subfolder 915, file folder retriever 430 creates such long-term structure and identifies it in a known manner as having been derived from subfolder 915. In a subsequent session, user 160 may again select subfolder 915 for processing. File folder retriever 430 advantageously accesses such long-term structure identified with subfolder 915. File folder retriever 430 accesses subfolder 915, as described above, and compares the version identifier of each email in such subfolder with the version identifiers of the documents processed and stored in such long-term structure. If a match is found for an email, file folder retriever 430 preferably does not store such email in document buffer 312. After so comparing all such emails in subfolder 915, file folder retriever 430 preferably deletes from such long-term structure all document records that did not have a match with an email of subfolder 915. Such non-match may occur, for example, because an email located in subfolder 915 during such previous session was subsequently deleted or moved. File folder retriever 430 copies such edited long-term structure to topic tree data structure 314 and stores emails in subfolder 915 that were not so matched into document buffer 312. Advantageously, emails of subfolder 915 that are retained from one session to another thus are not repeatedly processed by linguistic filter 100.

Similarly, avoidance of such repeated processing may be accomplished within a single session. For example, user 160 may select subfolder 915 for processing, initiate the selection of another subfolder, and then re-select subfolder 915. File folder retriever 430 preferably undertakes the above-described operations to preserve the topic tree data structure 314 derived from subfolder 915 and then, when user 160 re-selects subfolder 915, restore those portions of such topic tree data structure 314 corresponding to still existing emails in subfolder 915.

User 160 may also change the previous selection of natural languages. If user 160 changes the selection of natural languages by use of the aforementioned pull-down menu of available languages or by another method, topic list filter 820 refreshes topic list 318. That is, topic list filter 820 accesses head topics and topic modifiers in topic tree data structure 314 corresponding to documents having an entry in natural language classification fields 624 matching one or more of the natural languages in such changed selection. Such language-compliant head topics and topic modifiers are stored in topic list 318 in the manner described above.

User 160 may also select a document for viewing by selecting an entry in either document identifiers 1010 or topics 1020. Advantageously, if user 160 selects an entry from document identifiers 1010, the document corresponding to such selected subject entry is displayed, as described below in relation to FIG. 16. Preferably, if user 160 selects one or more entries from topics 1020, the document corresponding to such selected topic is displayed, and the grammatical units corresponding to the selected topic or topics are highlighted, as described below. Many other schemes for selectively displaying or highlighting selected documents or portions thereof are possible in alternative implementations of the present embodiment.

Figure 11:
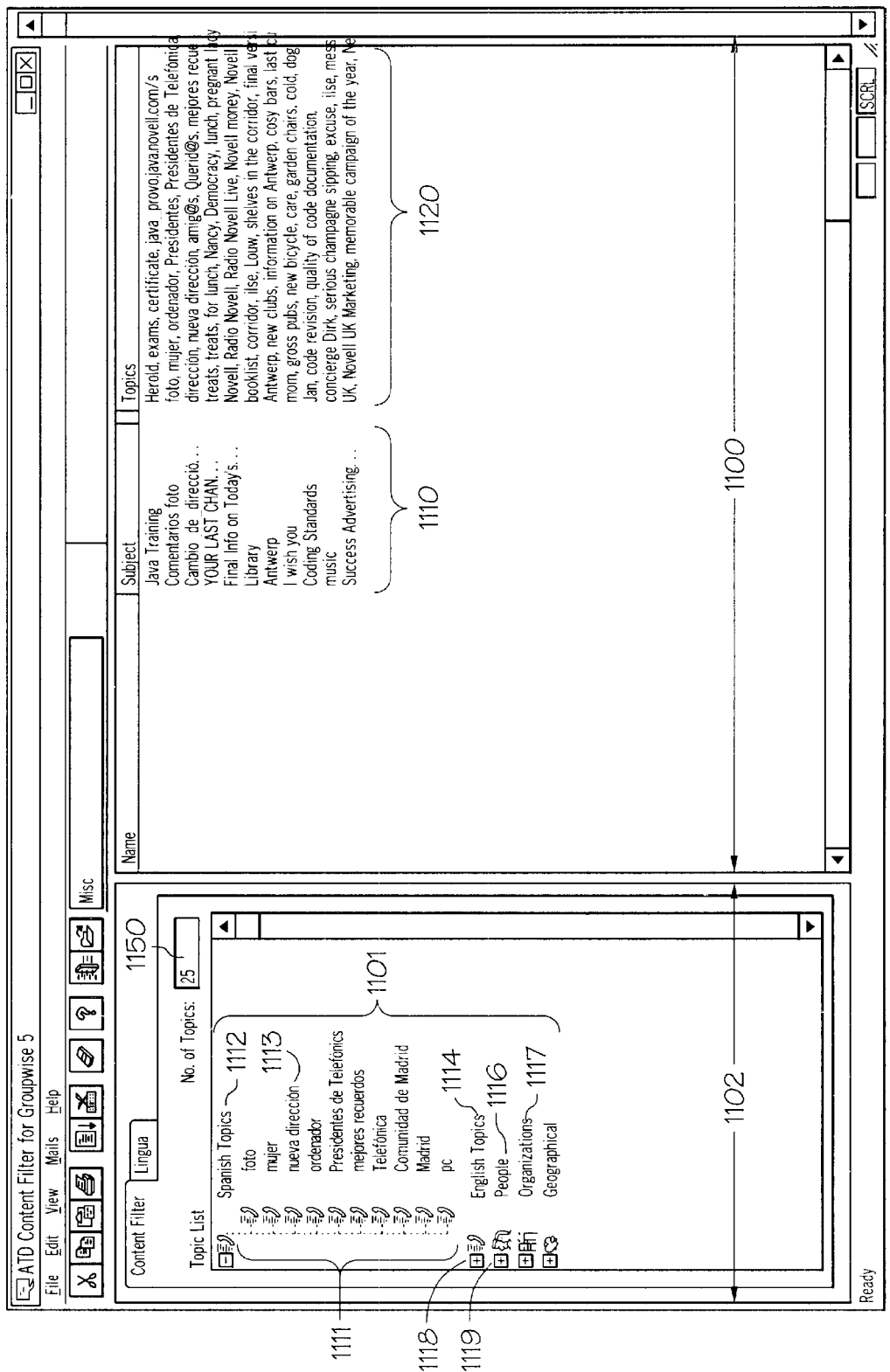
FIG. 11 shows one embodiment of a graphical user interface generated by the interface manager of FIG. 4 including a merged topic tree derived from the merged topic tree data structure of FIG. 7 in one window, and document identifiers and related topics that gave rise to the merged topics of the merged topic tree in another window.

By selecting topic-merge button 1055, or by any other known method, user 160 may also direct linguistic filter 100 to create a merged topic tree. FIG. 11 shows an illustrative example of merged topic tree 1101 within topic window 1102. Upon receiving such topic-merge command from GUI interpreter 410, linguistic topic analyzer 330 accesses topic tree data structure 314. To dynamically create a merged topic tree, topic analyzer 330 preferably operates upon language-compliant weighted head topics and topic modifiers already stored in topic tree data structure 314. For example, if user 160 had selected Spanish from the pull-down menu of available languages, as described above, and natural language classification field 624A for document A contained the Spanish natural language classification, then the head topics and topic modifiers in the document record of document A would be selected for processing by topic analyzer 330. In alternative embodiments, such selection by natural language need not be included. That is, topic analyzer 330 may operate upon head topics and topic modifiers contained in topic tree data structure 314 that are not language-compliant.

In the illustrated embodiment, topic analyzer 330 preferably operates upon such language-compliant head topics and topic modifiers as if they had been contained in a single document; that is, a single merged topic tree is dynamically created using the language-compliant head topics and topic modifiers as a single-document input. Thus, in reference to FIG. 10, the head topics and topic modifiers shown in topics 1020, which are all language-compliant because of the operation of topic list filter 820 as described above, are operated upon by topic analyzer 330 in the same manner as if they had constituted the content of a single document. Preferably, such operation includes weighing of the merged topics by frequency of occurrence or other factors, as noted above.

Figure 7:
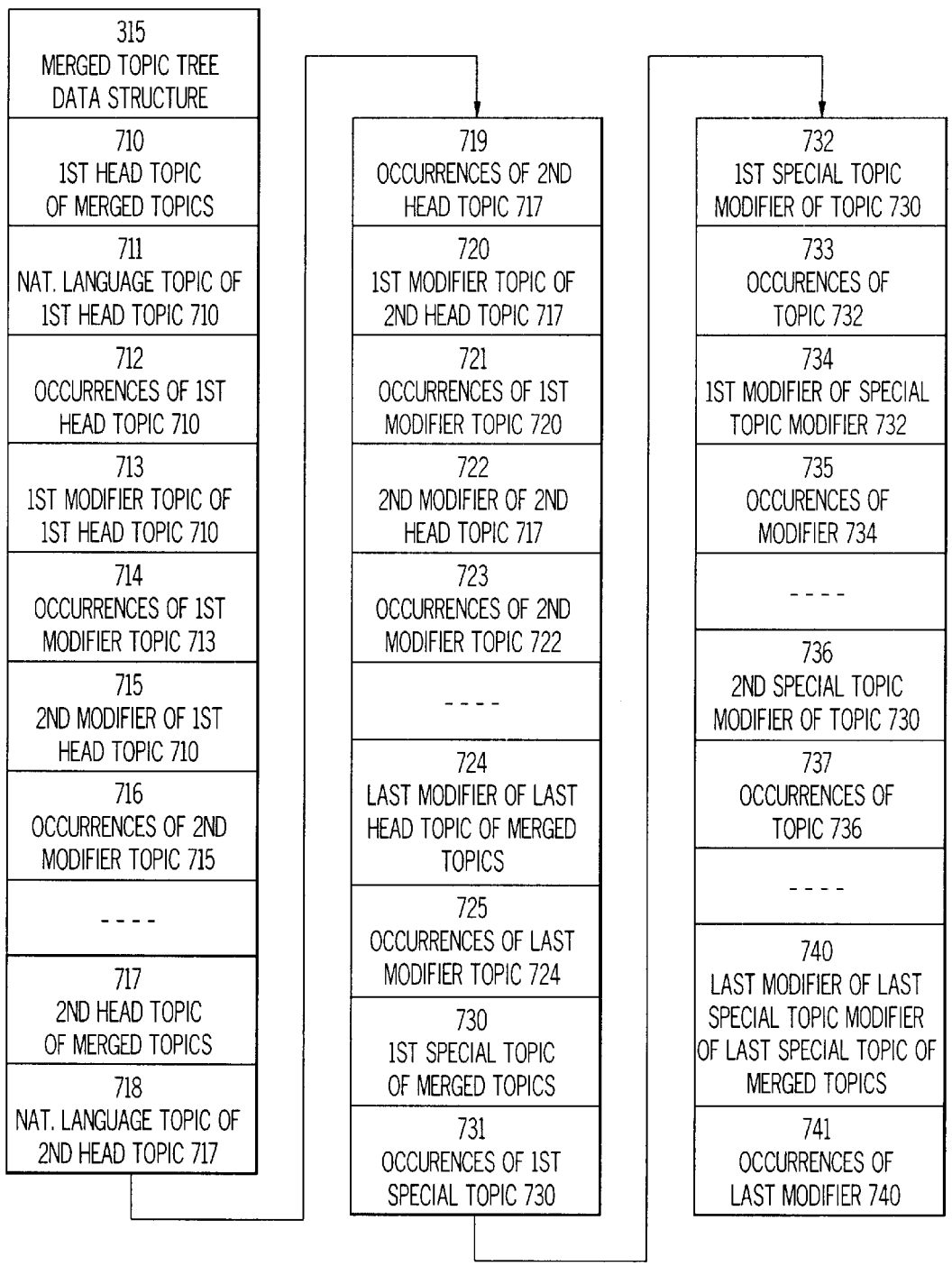
FIG. 7 is a schematic diagram of one embodiment of a merged topic tree data structure into which one embodiment of a linguistic topic analyzer of the linguistic filter of FIG. 1 places topics and related data.

Topic analyzer 330 stores the weighted, merged head topics and merged topic modifiers in merged topic tree data structure 315. FIG. 7 shows one of many possible data structures of merged topic tree data structure 315. Typically, merged topic tree data structure 315 includes many topic records. Such topic records are shown in FIG. 7 by blocks 710 through 716 representing the topic record for the first merged head topic, blocks 717 through 723 representing the topic record for the second merged head topic, and so on. Preferably, topic analyzer 330 stores such merged head topics, and their modifier topics, in weighted order. For example, first merged head topic 710 has the heaviest weight of the merged head topics, first modifier topic of first merged head topic 713 has the heaviest weight of the modifier topics of the first merged head topic, and so on. The occurrence records of the merged head topics and their topic modifiers, such as represented by blocks 712, 714, 716, and so on, preserve the locations specified in the corresponding occurrence records of topic tree data structure 314; i e., the location of grammatical units in documents A through N.

For example, if head topic fields 610A, 616B and 610N had contained the head topic "mom," and such head topic had occurred more frequently than other head topics in topic tree data structure 314, then first merged head topic 710 typically is the topic "mom." Field 713, containing the occurrences of first merged head topic 710, therefore contains the occurrences of the topic "mom" in document A as preserved in field 611A, such occurrences in document B as preserved in field 617B, and such occurrences in document N as preserved in field 611N.

Preferably, topic analyzer 330 also stores in merged topic tree data structure 315 the natural language classifications of the document records of the topics in topic tree data structure 314 that gave rise to each merged head topic. Thus, with respect to head topic 710 of the previous example, topic analyzer 330 identifies the natural language classification associated with the head topic "mom" in documents A, B, and N by examining natural language classification fields 624A, 624B, and 624N, respectively. Typically, the natural language classifications will be the same with respect to each such document record, for example, "English," but it need not be so. Topic analyzer 330 preserves such natural language classifications by storing them in the topic record of the merged head topic. With respect to the present example, the natural language classification "English" is therefore stored in natural language classification field 711.

Preferably, topic analyzer 330 also stores in merged topic tree data structure 315 the special topics and special topic modifiers of the document records in topic tree data structure 314. For purposes of illustration, it is assumed that first special topic of document B, as contained in field 625B of topic tree data structure 314, is the predetermined special topic "Organizations," and that associated with it (but not shown in the partial example of FIG. 6) are the special topic modifiers "Companies" and, as a modifier of such special topic modifier, the word "Novell." Such special topic "Organizations" is stored, for example, in first special topic block 730, its special modifier "Companies" in first special modifier block 732, and the modifier "Novell" in first modifier block 734. The respective occurrence records are stored in blocks 731, 733, and 735.

In the manner described above with respect to its operation on topic tree data structure 314, display manager 340 operates upon merged topic tree data structure 315. That is, display manager 340 creates from merged topic tree data structure 315 a topic list 318 and a topic index 316. As noted, such topic index 316 facilitates the generation by graphical user interface generator 420 of a collapsible and expandable topic tree based on the information regarding the topic display elements contained in topic list 318. Preferably, such topic tree is displayed in a graphical user interface that also includes the documents identifiers and related topics of the documents that gave rise to such topic tree. Such display arrangement enables user 160 efficiently and intuitively to relate merged topics in the topic tree to the documents that gave rise to such merged topics.

FIG. 11 shows such a graphical user interface as generated in a known manner by GUI generator 420 including, in topic window 1102, merged topic tree 1101. The graphical user interface of FIG. 11 also includes, in document window 1100, document identifiers 1110 and related topics 1120 that gave rise to the merged topics. As noted, merged topic tree 1101 is a collapsible and expandable tree-type hierarchical graphical interface. For convenience, the display elements of the highest level of such hierarchical structure are referred to as principal topics.

Preferably, merged topic tree 1101 includes as principal topics those natural language classifications contained in topic list 318, hereafter referred to as principal natural language classifications. In the illustrative example shown in FIG. 11, Spanish Topics 1112 and English Topics 1114 represent such principal natural language classifications for the natural language classifications "Spanish" and "English," respectively. As noted, only natural language classifications, and thus principal natural language classifications, that are associated with one or more natural language classifications of the document records of merged topic tree data structure 315 are included in topic list 318.

It is assumed for illustrative purposes that user 160, in a known manner, has selected Spanish Topics 1112 to expand it. In response to such selection, GUI generator 420 generates in a known manner from topic list 318 and topic index 316 a hierarchical display of language-consistent merged head topics under such principal natural language classification, including, for example, merged head topic "nueva dirección" 1113. A language-consistent merged head topic is one that has in its topic record an entry for a corresponding natural language. Thus, for example, merged head topics 1111 displayed under Spanish Topics 1112 are those that have in their topic records an entry for the natural language classification "Spanish." For example, merged head topic "nueva dirección" 1113 may be assumed for illustrative purposes to be stored in second head topic block 717, and the natural language classification "Spanish" is therefore stored in natural language classification block 718. Topic modifiers under each such language-consistent merged head topic, if present, may also be displayed by GUI generator 420 in a known manner in response to user 160 selecting a language-consistent merged head topic to expand.

Preferably, GUI generator 420 limits the number of language-consistent merged head topics that it displays under each principal natural language classification to a user-selected maximum number. Such maximum number is optionally selected by user 160 by entering it in a known manner into text block 1150, or by other known means. Such maximum number is communicated to GUI generator 420 in a known manner, thereby enabling GUI generator 420 in a known manner to so limit the number of displayed language-consistent merged head topics. If user 160 does not enter such maximum number, then all language-consistent merged head topics are displayed. In other implementations, a preselected, default maximum number may be used. In alternative embodiments, such maximum number, whether user-selected or default, may similarly be applied to limit the number of merged head topics, or topic modifiers, or both, that are displayed under any type of principal topic, merged head topic, or topic modifier.

Merged topic tree 1101 preferably also includes as principal topics special merged topics contained in topic list 318, hereafter referred to as principal special topics. In the illustrative example shown in FIG. 11, the display elements People 1116 and Organizations 1117 are such principal special topics. User 160, in a known manner as noted above with respect to principal natural language classifications, may expand each of such principal special topics to display associated merged special topic modifiers and topic modifiers of such merged special topic modifiers (not shown), if any. Such associated merged special topic modifiers and their topic modifiers are those that are included in a special topic record of merged topic tree data structure 315 and thus included in topic list 318 by topic list generator 810. For example, blocks 730 through 735 represent a first special topic record in merged topic tree data structure 315. It is assumed for illustrative purposes that merged first special topic 730 is the merged special topic represented by Organizations 1117. It may further be assumed that first special topic modifier 732 is represented by a display element "Companies" (not shown) in accordance with such hierarchical arrangement of special topics as noted above. Such an arrangement arises, for example, if topic analyzer 330 identifies a grammatical unit, such as the word "Novell," that is associated with such special topic and special topic modifier in a morphosyntactic dictionary, as noted above. Thus, in the present example, first modifier of such topic modifier 734 is the topic modifier "Novell." Topic modifiers of such topic modifier "Novell," if present, may also be displayed by GUI generator 420 in a known manner in response to user 160 selecting topic modifier "Novell" for expansion. Optionally associated with each principal topic, merged head topic, merged topic modifier, and so on, are representative icons. For example, list-with-pencil icon 1118 may be a default icon for topic elements, such as principal natural language classification English Topics 1114, and people-profile icon 1119 may represent principal special topic People 1116.

Figure 12:
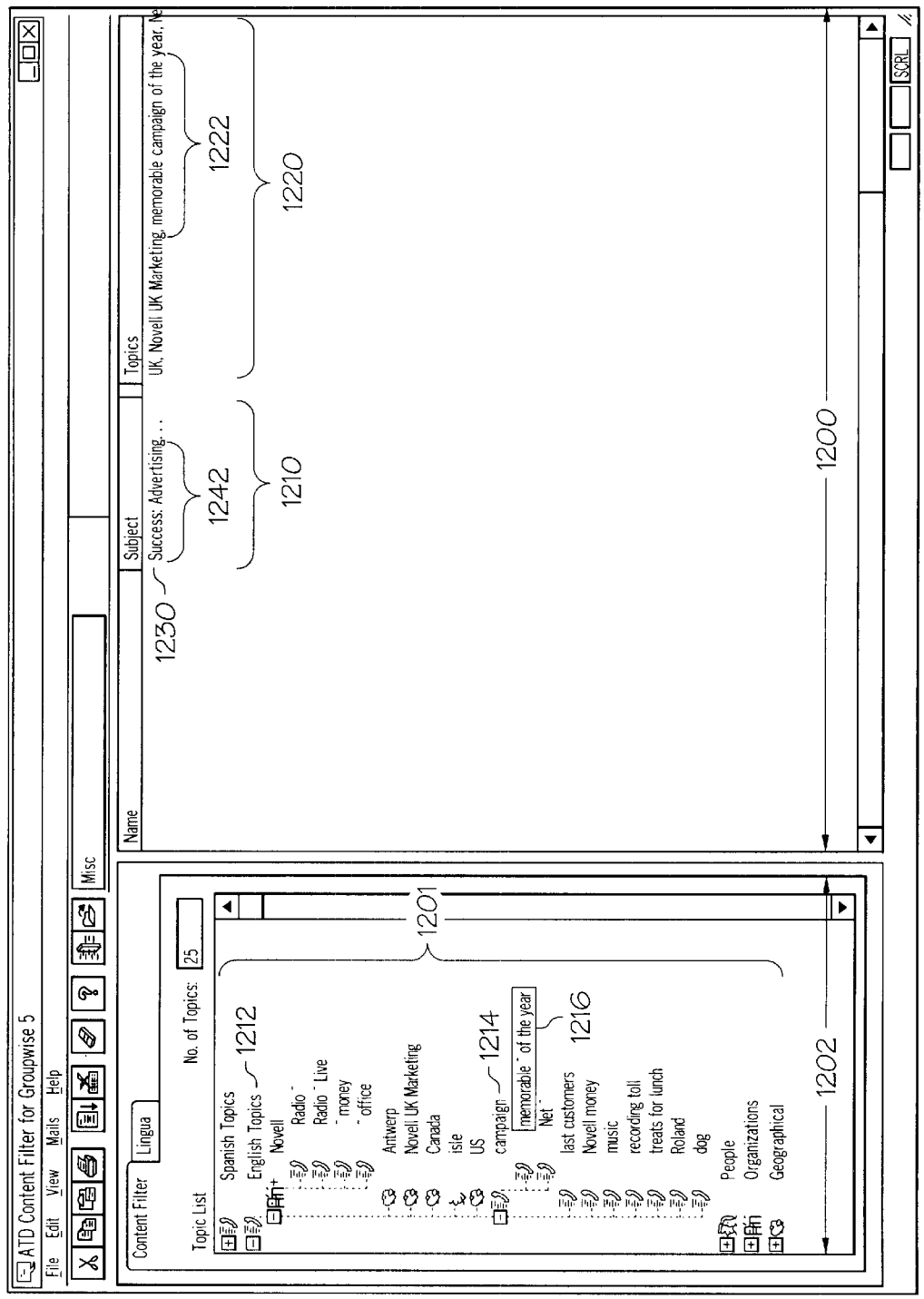
FIG. 12 shows one embodiment of a graphical user interface of the merged topic tree of FIG. 11 as partially expanded and partially collapsed by the user, including a user-selected merged topic, and of a document window including document identifiers and related topics associated with documents, the linguistic content of which are represented by such user-selected merged topic.

FIG. 12 shows a graphical user interface including a merged topic tree from which user 160 has selected a merged topic. FIG. 12 also shows document identifiers and related topics associated with documents, the linguistic content of which is represented by such selected merged topic. In particular, it is assumed for illustrative purposes that user 160 has selected topic "memorable~of the year" 1216 from topic tree 1201 constructed by GUI generator 420. As is evident from the known hierarchical structure of topic tree 1201, topic 1216 is a subtopic of campaign 1214 that, in turn, is a subtopic of English Topics 1212, which is a principal natural language classification. Thus, campaign 1214 is generated by GUI generator 420 from entries in topic list 318 and topic index 316 that, in turn, are generated by topic list generator 810 from a merged head topic, such as first merged head topic 710. In such example, natural language classification 711 corresponds to principal natural language classification 1212. Similarly, topic 1216 in this example is derived from a modifier topic of first merged head topic 710, such as first modifier topic 713.

GUI generator 420 advantageously displays only document identifiers and related topics that represent documents the contents of which are represented by the user-selected merged topic or topics. Therefore, for the illustrative example in which user 160 selects merged topic 1216 from topic tree 1201, document identifiers 1210 and related topics 1220 include the document identifier and related topics, respectively, of document entry 1230. Document entry 1230 is so included because its related topic 1222 corresponds to merged topic 1216. These topics correspond because merged topic 1216 was derived from topic 1222 in the manner described above. Document entry 1230 also includes document identifier 1242 that, as noted, is the subject of an email from user-selected subfolder 915. It is assumed for purposes of illustration that the email identified by document identifier 1242 is the only email in user-selected subfolder 915 the content of which is represented by topic 1216. Thus, it is the only email represented in document window 1200.

Figure 14:
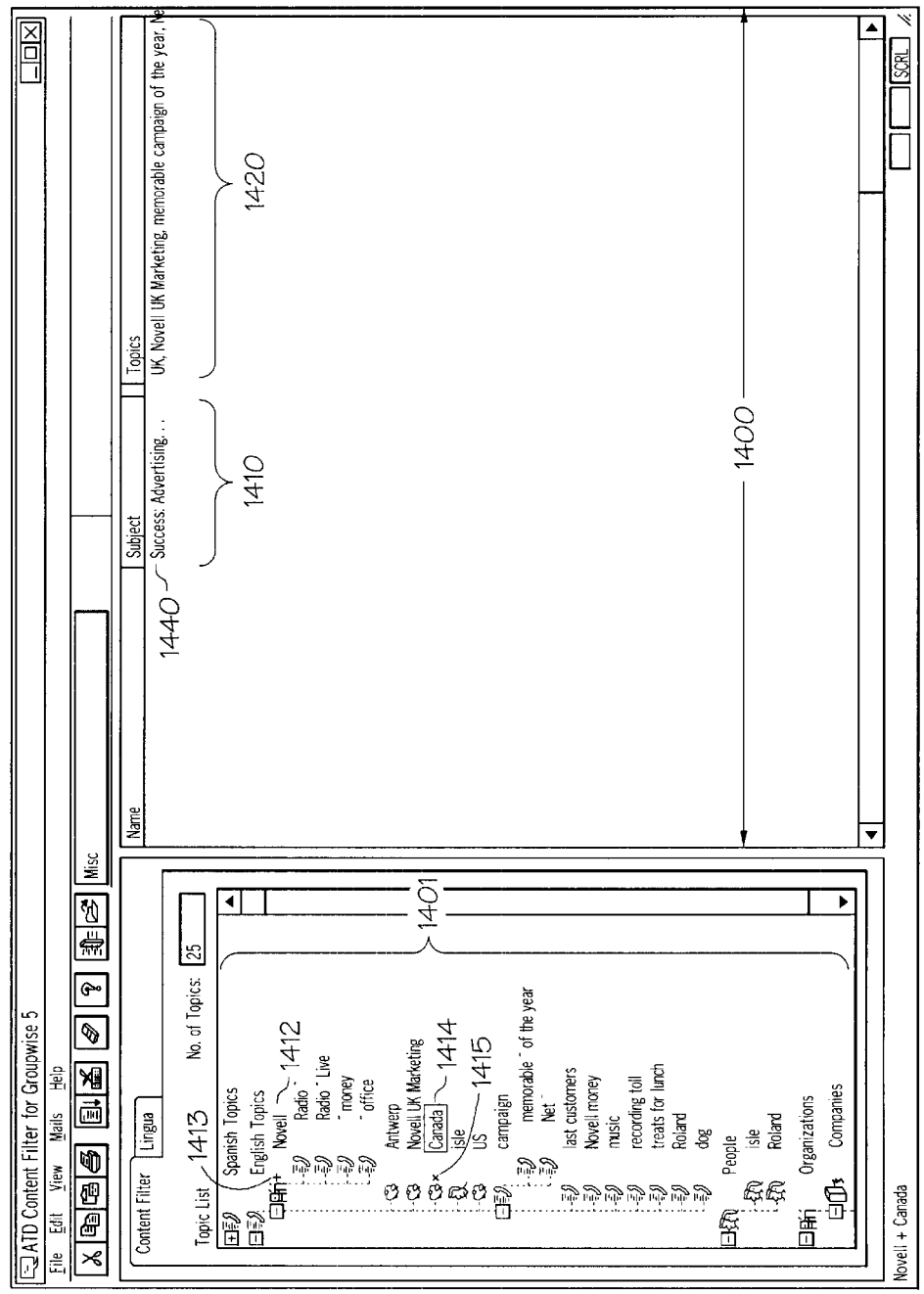
FIG. 14 shows one embodiment of a graphical user interface of the merged topic tree of FIG. 12 including user-selected boolean NOT merged topics, and of a document window including document identifiers and related topics associated with documents, the linguistic content of which are represented by such user-selected boolean NOT merged topics.
Figure 15:
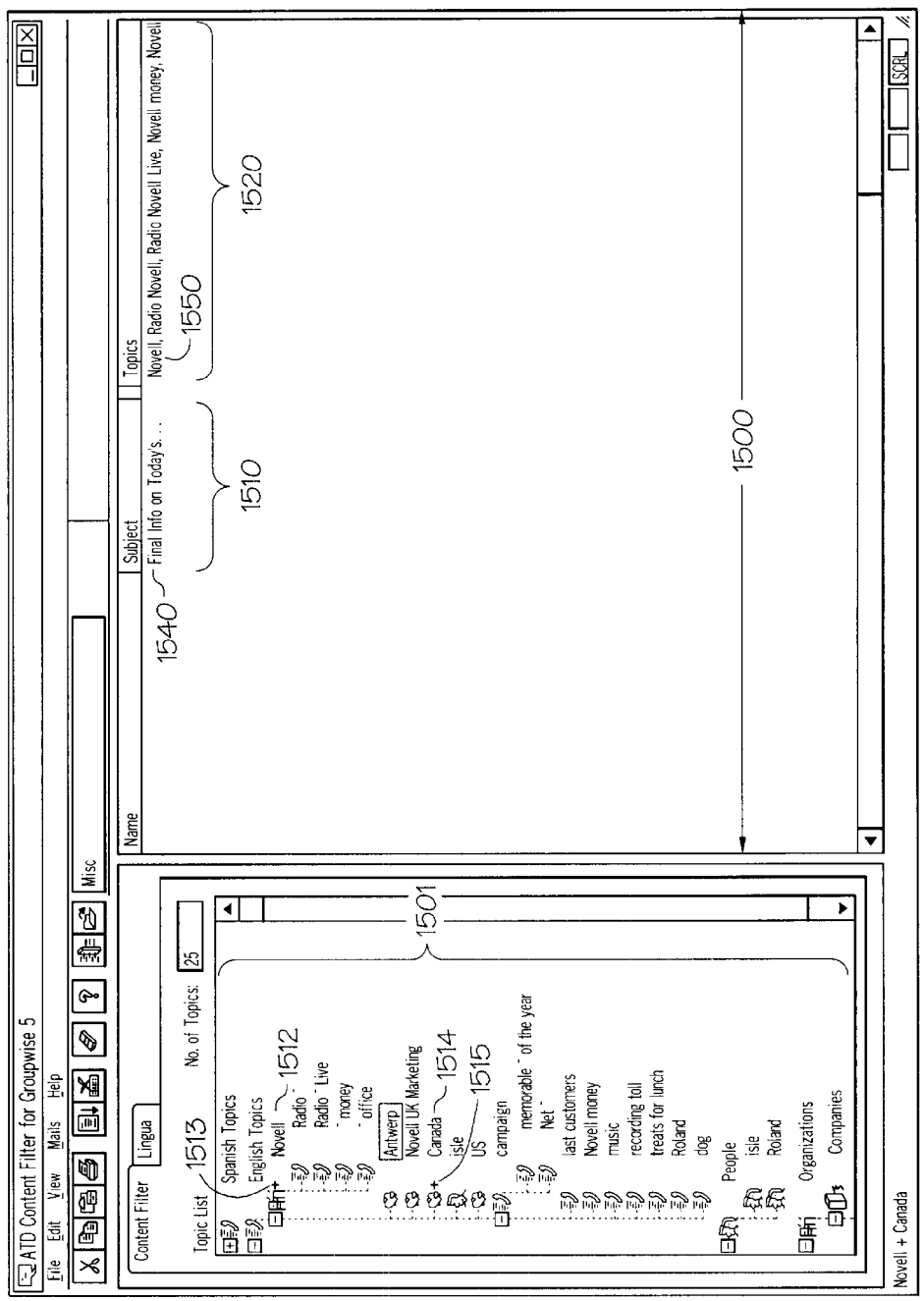
FIG. 15 shows one embodiment of a graphical user interface of the merged topic tree of FIG. 12 including user-selected boolean AND merged topics, and of a document window including document identifiers and related topics associated with documents, the linguistic content of which are represented by such user-selected boolean AND merged topics.

Advantageously, linguistic filter 100 thus enables user 160 efficiently and intuitively to select for display, and hence to readily identify, those documents in the user-selected files the linguistic contents of which are represented by one or more user-selected merged topics. Additional aspects of such advantages are shown in FIGS. 13, 14 and 15 that represent boolean user-selections of merged topics from the merged topic tree.

Figure 13:
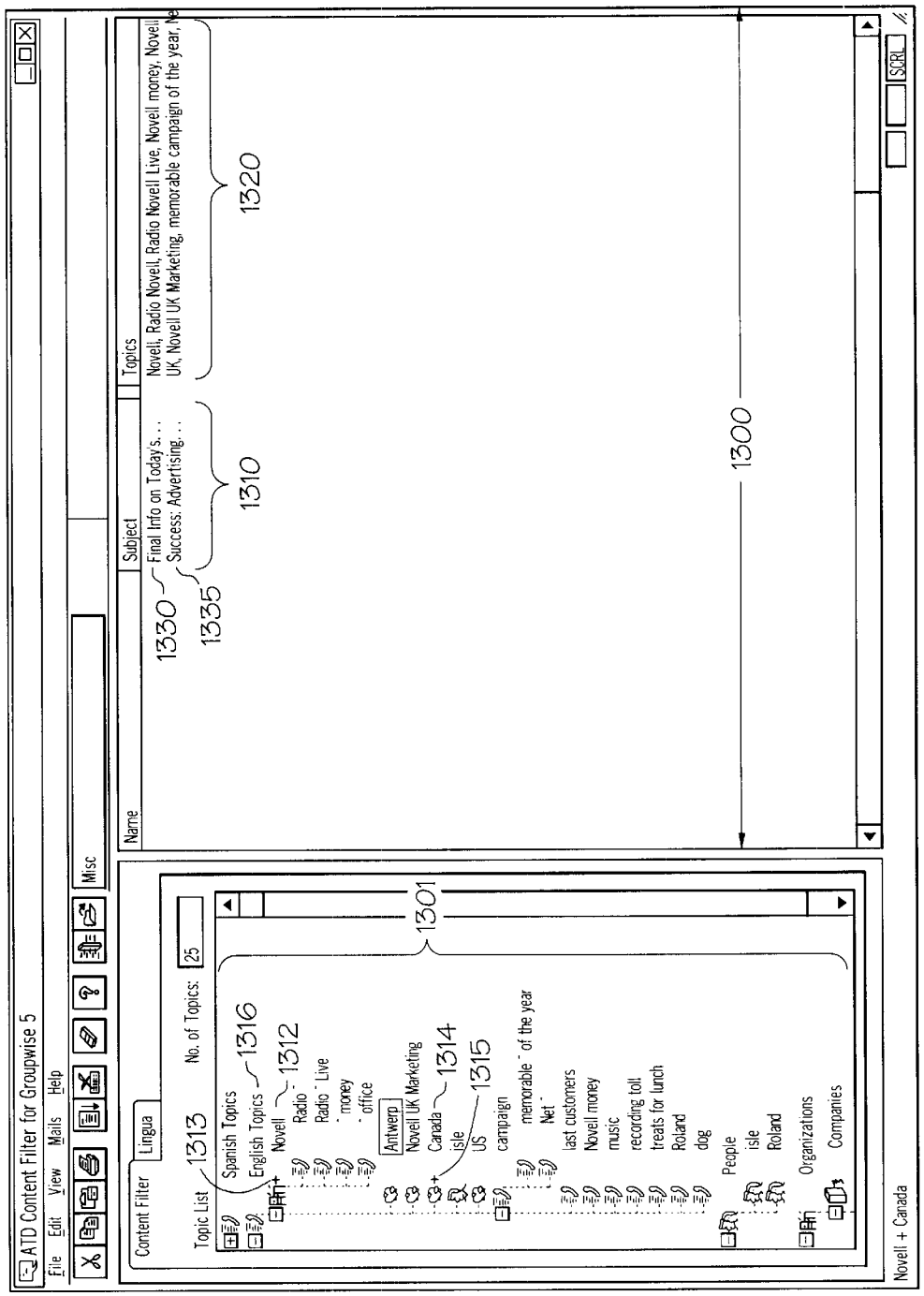
FIG. 13 shows one embodiment of a graphical user interface of the merged topic tree of FIG. 12 including user-selected boolean OR merged topics, and of a document window including document identifiers and related topics associated with documents, the linguistic content of which are represented by such user-selected boolean OR merged topics.

FIG. 13 shows one embodiment of a graphical user interface of the merged topic tree of FIG. 12 including user-selected boolean OR merged topics. FIG. 13 also shows one embodiment of a document window including document identifiers and related topics associated with documents, the linguistic content of which are represented by such user-selected boolean OR merged topics. It is assumed for illustrative purposes that user 160 selects the OR boolean function for filtering documents represented in document window 1300. Such selection may be made in accordance with any of a variety of known means, such as choosing from a pull down menu (not shown). It is further assumed that user 160 applies such boolean OR filter to merged topic Novell 1312 and to merged topic Canada 1314 of merged topic tree 1301. Optionally, such OR selections are indicated in accordance with known means by displaying the "+" symbol 1313 and 1315, or any other icon or symbol, in relation to such merged topics 1312 and 1314, respectively. Although in this example two merged topics are included in the boolean expression, it will be understood that the invention is not so limited. User 160 may select any number of merged topics. Upon making a selection, user 160 typically initiates a re-display of document window 1300 by any of a variety of known means, such as by selecting a command from a pull-down menu or selecting a button (not shown). Alternatively, if the number of merged topics that may be included in a boolean expression is limited in another implementation of the present embodiment, such re-display may be initiated automatically by the selection by user 160 of the last of such merged topics.

Preferably, any merged topics superior to the selected merged topics are included in the boolean expression. That is, in terms of the present illustrative example, the selection by user 160 of Novell 1312 and Canada 1314 includes the implicit selection of the superior merged topic English Topics 1316. That is, user 160 is understood in the present example to have selected for display those documents that are in English and are represented either by the topic "Novell," or the topic "Canada," or both. In an alternative implementation, such superior topics need not be considered. That is, user 160 may be understood to have selected for display those documents that are represented either by the topic "Novell" or the topic "Canada," or both, whether or not such documents are written in English. In one such alternative implementation, such optional interpretations may be user-selectable.

Document list generator 840 implements such user-generated boolean selection by storing in document list 842 those document identifiers and topics corresponding to document records in topic tree data structure 314 having one or more of the user-selected merged topics. In terms of the present implementation of the present example, such user-selected merged topics are "Novell" in a document having a natural language classification of English, or "Canada" in a document having a natural language classification of English, or both. If, for example, field 624A in FIG. 6 indicate that document A of topic tree data structure 314 is written in English, and a head topic or topic modifiers field, such as 610A or 620A, contains either the topic "Novell," or "Canada," or both, then the document identifier and topics of document A are included by document list generator 840 in document list 842 in the manner described above. Preferably, document list generator 840 selects document A for inclusion in document list 842 only if there is a match between the hierarchical level of the user-selected merged topics and the matching ones of topic tree data structure 314. For example, the user-selected merged topic "Novell" is a special head topic rather than a modifier of a special head topic. Thus, in such alternative implementation, document list generator 840 may consider a match to be made only if the matching entry in topic tree data structure is also a special head topic rather than a modifier of a special head topic. Similarly, user-selected head topics may be matched only with head topics of topic tree data structure 314 rather than with topic modifiers, and so on. In one such alternative implementation, such optional interpretations may be user-selectable.

In the manner described above, GUI generator 420 accesses the information stored by document list generator 840 in document list 842 to generate document window 1300. Such window includes two document entries, 1330 and 1335, identified by their respective document identifiers in document identifiers 1310. Because of the noted operations of document list generator 840, such documents, which are emails from subfolder 915 in the present example, are those that are written in English and contain either the topic "Novell," or the topic "Canada," or both. The corresponding representative topics, either "Novell," "Canada," or both, therefore appear in topics 1320.

User 160 thereby is presented with a clear and informative display of those emails in subfolder 915 that satisfy the user-selected boolean expression. Also, the relationships among such displayed documents, the user-selected merged topics and operators that formed such boolean expression, and the merged topic tree as a whole are intuitively and clearly presented to user 160 by a single graphical user interface containing all such relationships and information.

FIG. 14 shows one embodiment of a graphical user interface of the merged topic tree of FIG. 12 including user-selected boolean NOT merged topics. FIG. 14 also shows one embodiment of a document window including document identifiers and related topics associated with documents, the linguistic content of which are represented by such user-selected boolean NOT merged topics. The operation of linguistic filter 100 with respect to such user selection is the same as that described above with respect to the boolean OR operation of FIG. 13, except that a boolean NOT operation is employed instead of a boolean OR operation. Thus, as indicated by symbols 1413 and 1415 in relation to their respective user-selected merged topics Novell 1412 and Canada 1414, document entry 1440 represents the only email in subfolder 915, written in English, that is represented in topic tree data structure 314 by the topic "Novell" and not by the topic "Canada."

Similarly, FIG. 15 shows one embodiment of a graphical user interface of the merged topic tree of FIG. 12 including user-selected boolean AND merged topics. FIG. 15 also shows one embodiment of a document window including document identifiers and related topics associated with documents, the linguistic content of which are represented by such user-selected boolean AND merged topics. The operation of linguistic filter 100 with respect to such user selection is the same as that described above with respect to the boolean OR and NOT operations of FIGS. 13 and 14, except that a boolean AND operation is employed. Thus, as indicated by symbols 1513 and 1515 in relation to their respective user-selected merged topics Novell 1512 and Canada 1514, document entry 1540 represents the only email in subfolder 915, written in English, that is represented in topic tree data structure 314 by the topic "Novell" and by the topic "Canada."

Figure 16:
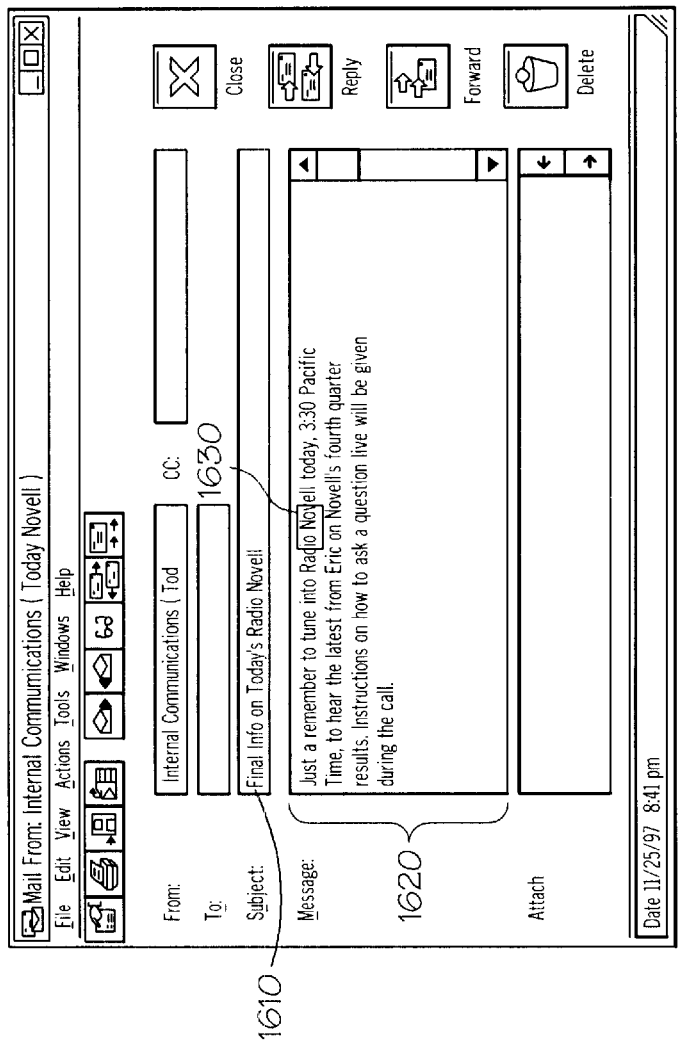
FIG. 16 shows one embodiment of a graphical user interface including the text of a user-selected document represented by a document identifier or related topic associated with such document on a document window of any one of the graphical user interfaces of FIGS. 10, 11, 12, 13, 14, or 15.

FIG. 16 shows one embodiment of a graphical user interface including the text of a user-selected document. Advantageously, such selection is made by choosing a document identifier or related topic from the document window of a graphical user interface. For example, it is assumed for purposes of illustration that user 160 selects in a known manner topic Novell 1550 as displayed in document window 1500 of FIG. 15. GUI generator 420 accesses document list 842 to determine the document record in topic tree data structure 314 from which document entry 1540 was generated in the manner described above. GUI generator 420 preferably makes such determination by following the pointer stored with respect to document entry 1540 in document list 842 by document list generator 840. As described above, such pointer points to pointer field 605 of the document record in topic tree data structure 314 that gave rise to such document entry. Other known techniques for making this determination may be employed in other implementations.

For illustrative purposes, it is assumed that such linkage in the present implementation points to pointer 605A, indicating that document entry 1540 corresponds to document A of topic tree data structure 314. GUI generator 420 preferably follows pointer 605A to document A identifier 510A in document buffer 312. GUI generator 420 also preferably accesses the occurrence record in document record A corresponding to the topic "Novell." For example, if such topic is stored in first head topic 610A, then generator 420 accesses occurrences 611A to obtain the locations in document A of the grammatical units that gave rise to the topic "Novell." GUI generator 420 preferably displays document A identifier 510A and document A text 520A in a graphical user interface. One embodiment showing such display elements are display elements 1610 and 1620, respectively, of FIG. 16. Preferably, GUI generator 420 also highlights, in a known manner, the grammatical unit or units that gave rise to the selected topic, such as shown by element 1630 in the present example. It will be understood to those skilled in the relevant art that the term "highlight" and its grammatical variants includes marking or making prominent by any known means such as use of color of background or foreground, change of font, change of type, and so on. The term "highight" will similarly be understood to include displaying only the grammatical unit or units, or such units and a portion of surrounding text such as a phrase, sentence, paragraph, or page, and not displaying other text. In the present implementation, GUI generator 420 typically displays document A without such highlighting if user 160 selects the document identifier, such as the identifier for document entry 1540 in document identifiers 1510. In the same manner, user 160 may select either topics or document identifiers from the document windows of FIGS. 10, 11, 12, 13, or 14 so that the text and document identifier of the corresponding document may be displayed.

Having now described one embodiment of the invention, it should be apparent to those skilled in the relevant art that the foregoing is illustrative only and not limiting, having been presented by way of example only. In particular, the graphical user interfaces shown in FIGS. 9–16 are intended to be illustrative only. Many other schemes for displaying, arranging, highlighting, illustrating, and otherwise presenting the information presented in such Figures are possible in accordance with the present invention. Also, there are many possible variations of the architecture for the data structures described above, including those of document buffer 312, topic tree data structure 314, and merged topic tree data structure 315. Also, the present invention is not limited to the illustrative examples of documents that are emails. Rather, any document, or portion thereof, containing text in a natural language may be operated upon as described above, including technical documentation, publications, notes, correspondence, and so on. In addition, it will be understood by those skilled in the relevant art that control and data flows between and among functional modules of the invention and various data structures may vary in many ways from the control and data flows described above. For example, intermediary functional modules (not shown) may direct such flows; the functions of various modules may be combined, divided, or otherwise rearranged to allow parallel processing or for other reasons; intermediate data structures may be used; various described data structures may be combined; the sequencing of functions or portions of functions generally may be altered; and so on. Numerous other embodiments, and modifications thereof, are contemplated as falling within the scope of the present invention as defined by appended claims and equivalents thereto.

What is claimed is:

1. A computer system having at least one central processing unit (CPU), an operating system, and at least one memory unit, and being coupled to at least one file system including at least one file having a plurality of documents, said at least one memory unit having stored therein a set of linguistic filter instructions for execution by said at least one CPU in cooperation with said operating system, said computer systems comprising:

at least one graphical user interface configured to enable a user to select for analysis the at least one file having a plurality of documents;

said set of linguistic filter instructions comprising:

a linguistic topic analyzer configured to dynamically analyze at least one of said plurality of documents and dynamically to generate at least one topic representing a linguistic content of said at least one of said plurality of documents; and a display manager configured to display said at least one topic generated by said linguistic topic analyzer.

2. The computer system of claim 1, wherein:

said analysis by said linguistic topic analyzer comprises morphological and syntactic analysis of said at least one of said plurality of documents.

3. The computer system of claim 1, wherein:

said set of linguistic filter instructions further comprises an interface manager configured to identify for each of said at least one of said plurality of documents a document identifier; and said display manager is further configured to display said document identifier.

4. The computer system of claim 3, wherein:

said at least one topic displayed by said display manager is a plurality of topics;

at least one of said plurality of topics is user-selected; and said display manager is further configured selectively to display said document identifier identifying at least one of said plurality of documents having a linguistic content represented by said at least one user-selected topic.

5. The computer system of claim 4, wherein:

said at least one of said plurality of user-selected topics are at least two user-selected topics;

said at least two user-selected topics are user-combined in a boolean combination; and said at least one of said plurality of document identifiers displayed by said display manager identifies at least one of said plurality of documents, if present, having a linguistic content represented by said boolean combination of said at least two user-selected topics.

6. The computer system of claim 5, wherein:

said boolean combination is a non-exclusive OR combination.

7. The computer system of claim 3, wherein said interface manager is further configured to:

retrieve said at least one file and provide said plurality of documents of said at least one file to said linguistic topic analyzer; and generate, in cooperation with said display manager, said at least one graphical user interface comprising (a) said at least one topic generated by said linguistic topic analyzer, and (b) said document identifier of said at least one of said plurality of documents having a linguistic content represented by said at least one topic, wherein said at least one graphical user interface is configured to receive user selections of said at least one topic.

8. The computer system of claim 1, wherein said set of linguistic filter instructions further comprises:

a language identifier configured to identify at least one natural language in which said at least one of said plurality of documents is written.

9. The computer system of claim 3, wherein:

said set of linguistic filter instructions further comprises a language identifier configured to identify at least one user-selected natural language in which said at least one of said plurality of documents, when present, is written; and said display manager is further configured selectively to display said document identifier identifying at least one of said plurality of documents, when present, having a linguistic content represented by said at least one topic displayed by said display manager and written in said at least one user-selected natural language.

10. The computer system of claim 1, wherein:

said at least one file system is a local file system.

11. The computer system of claim 1, wherein:

said at least one of said plurality of documents is user-selected.

12. The computer system of claim 1, wherein:

said linguistic topic analyzer is further configured to identify at least one location in said at least one of said plurality of documents at which said linguistic content is located.

13. The computer system of claim 1, wherein:

said linguistic topic analyzer is further configured to dynamically assign a weight to said at least one topic.

14. The computer system of claim 1, wherein:

said linguistic topic analyzer is further configured to generate at least one predefined special topic representing said linguistic content, when present, of said at least one of said plurality of documents.

15. The computer system of claim 1, wherein:

said at least one topic displayed by said display manager is user-selected; and said display manager is further configured to display said at least one of said plurality of documents having a linguistic content represented by said at least one user-selected topic.

16. The computer system of claim 12 wherein:

said at least one topic displayed by said display manager is user-selected; and said display manager is further configured to selectively highlight said at least one location in said at least one of said plurality of documents at which is located said linguistic content represented by said at least one user-selected topic.

17. The computer system of claim 3, wherein:

at least one said document identifier displayed by said display manager is user-selected; and said display manager is further configured to display said at least one of said plurality of documents identified by said at least one user-selected document identifier.

18. A computer system having at least one central processing unit (CPU), an operating system, at least one memory unit, and a linguistic filter configured to cooperate with said at least one CPU and said operating system, said computer system being coupled to at least one file system including at least one file having a plurality of documents, said computer system comprising:

at least one graphical user interface configured to enable a user to select for analysis the at least one file having a plurality of documents;

said linguistic filter comprising:

a linguistic topic analyzer configured to dynamically morphologically and syntactically analyze at least one of said plurality of documents and dynamically to generate at least one topic representing a linguistic content of said at least one of said plurality of documents; and a display manager configured to display said at least one topic generated by said linguistic topic analyzer.

19. The computer system of claim 18, wherein:

said linguistic filter further comprises an interface manager configured to identify for each of said at least one of said plurality of documents a document identifier; and said display manager is farther configured to display said document identifier.

20. The computer system of claim 19, wherein:

said at least one topic displayed by said display manager is a plurality of topics;

at least one of said plurality of topics is user-selected; and said display manager is further configured selectively to display said document identifier identifying at least one of said plurality of documents having a linguistic content represented by said at least one user-selected topic.

21. The computer system of claim 19, wherein said interface manager is further configured to:

retrieve said at least one file and provide said plurality of documents of said at least one file to said linguistic topic analyzer; and generate, in cooperation with said display manager, said at least one graphical user interface comprising (a) said at least one topic generated by said linguistic topic analyzer, and (b) said document identifier of said at least one of said plurality of documents having a linguistic content represented by said at least one topic, wherein said at least one graphical user interface is configured to receive user selections of said at least one topic.

22. The computer system of claim 19, wherein:

said linguistic filter further comprises a language identifier configured to identify at least one user-selected natural language in which said at least one of said plurality of documents, if present, is written; and said display manager is further configured selectively to display said document identifier identifying at least one of said plurality of documents, if present, having a linguistic content represented by said at least one topic displayed by said display manager and written in said at least one user-selected natural language.

23. A computer-implemented method for displaying at least one topic representing a linguistic content of at least one of a plurality of documents, comprising the steps of:

(a) receiving a user selection of said at least one of a plurality of documents to be analyzed;

(b) dynamically, morphologically, and syntactically analyzing said at least one of said plurality of documents and dynamically generating said at least one topic; and (c) displaying said at least one topic.

24. The method of claim 23, further comprising the steps of:

(d) mutually ranking each of said at least one topic in order of descending linguistic importance;

(e) receiving a user selection of a maximum topic number; and (f) excluding from displaying said at least one topic when it is ranked lower than said maximum topic number with respect to the highest ranked of said at least one topic.

25. The method of claim 23, further comprising the steps of:

(d) identifying for each of said at least one of said plurality of documents a document identifier; and (e) displaying said document identifier.

26. The method of claim 23, wherein said at least one displayed topic is a plurality of topics, and further comprising the steps of:

(d) receiving a user selection of at least one of said plurality of topics; and (e) displaying said document identifier identifying at least one of said at least one of said plurality of documents having a linguistic content represented by said at least one user-selected topic.

27. The method of claim 23, further comprising the steps of:

(d) generating at least one graphical user interface comprising said at least one topic and said document identifier of said at least one of said plurality of documents having a linguistic content represented by said at least one topic; and (e) receiving a user selection of said at least one topic of said graphical user interface.

28. The method of claim 27, further comprising the steps of:

(f) receiving a user selection of at least one natural language;

(g) identifying at least one of said at least one user-selected natural language in which said at least one of said plurality of documents, when present, is written; and (h) selectively displaying said document identifier identifying at least one of said plurality of documents, when present, having a linguistic content represented by said at least one displayed topic and written in said at least one user-selected natural language.

29. A computer-implemented method for displaying on a graphical user interface at least one topic representing a linguistic content of at least one of a plurality of documents, and displaying at least one document identifier identifying at least one of said plurality of documents, said method comprising the steps of:

(a) receiving a user selection of said at least one of said plurality of documents to be displayed;

(c) displaying a topic window comprising said at least one topic; and (d) displaying a document window comprising at least one document identifier identifying at least one of said plurality of documents having a linguistic content represented by said at least one topic displayed in said topic window.

30. The method of claim 29, further comprising the steps of:
  (d) moving a cursor on the graphical user interface to a position in said topic window proximate to a desired one or more of said at least one topic;
  (e) selecting said one or more of said at least one desired topic; and
  (f) selectively displaying in said document window said document identifier identifying at least one of said plurality of documents having a linguistic content represented by said selected one or more of said at least one topic.

31. The method of claim 29, wherein said topic window comprises a hierarchical arrangement of said at least one topic.

32. The method of claim 31, wherein said hierarchical arrangement is a collapsible and expandable tree-like structure.

33. A computer system having at least one central processing unit (CPU), an operating system, at least one memory unit, and a linguistic filter configured to cooperate with said at least one CPU and said operating system, said computer system being coupled to at least one file system having at least one file, said at least one file having a plurality of documents, said computer system comprising:
  means for receiving a user selection of said at least one file having a plurality of documents to be analyzed;
  said linguistic filter comprising:
    means for identifying for each of at least one of said plurality of documents a document identifier;
    means for dynamically, morphologically, and syntactically analyzing said at least one of said plurality of documents and dynamically generating at least one topic representing a linguistic content of said at least one of said plurality of documents;
    means for displaying said at least one topic; and
    means for displaying said document identifier.

34. The computer system of claim 33, wherein:
  said at least one displayed topic is a plurality of topics;
  at least one of said plurality of topics is user-selected; and
  said linguistic filter further comprises means for selectively displaying said document identifier identifying at least one of said plurality of documents having a linguistic content represented by said at least one user-selected topic.

35. The computer system of claim 33, further comprising:
  means for identifying at least one user-selected natural language in which said at least one of said plurality of documents, if present, is written; and
  means for selectively displaying said document identifier identifying at least one of said plurality of documents, if present, having a linguistic content represented by said at least one topic displayed by said display manager and written in said at least one user-selected natural language.

36. Storage media that contains software that, when executed on an appropriate computing system, performs a method for displaying at least one topic representing a linguistic content of at least one of a plurality of documents, the method comprising the steps of:
  (a) receiving a user selection of said at least one of said plurality of documents to be analyzed;
  (b) dynamically analyzing said at least one of said plurality of documents and dynamically generating said at least one topic; and
  (c) displaying said at least one topic.

37. The storage media of claim 36, wherein said method further comprises the steps of:
  (d) identifying for each of said at least one of said plurality of documents a document identifier; and
  (e) displaying said document identifier.

38. The storage media of claim 36, wherein said at least one displayed topic is a plurality of topics, and wherein said method further comprises the steps of:
  (d) receiving a user selection of at least one of said plurality of topics; and
  (e) displaying said document identifier identifying at least one of said plurality of documents having a linguistic content represented by said at least one user-selected topic.

39. A computer program product for use with a windows environment, said computer program product comprising:
  a computer usable medium having embodied therein computer readable program code method steps for displaying at least one topic representing a linguistic content of at least one of a plurality of documents, the method steps comprising:
    (a) receiving a user selection of said at least one of a plurality of documents to be analyzed;
    (b) dynamically analyzing said at least one of said plurality of documents and dynamically generating said at least one topic; and
    (c) displaying said at least one topic.

40. The computer program product of claim 39, wherein said method steps further comprise:
  (d) identifying for each of said at least one of said plurality of documents a document identifier; and
  (e) displaying said document identifier.

41. The computer program product of claim 39, wherein said at least one displayed topic is a plurality of topics, and wherein said method steps further comprise:
  (d) receiving a user selection of at least one of said plurality of topics; and
  (e) displaying said document identifier identifying at least one of said plurality of documents having a linguistic content represented by said at least one user-selected topic.

* * * * *